United States Patent
Smith et al.

(10) Patent No.: US 9,467,843 B1
(45) Date of Patent: *Oct. 11, 2016

(54) METHODS AND SYSTEM FOR DYNAMIC SPECTRUM ARBITRAGE WITH A MOBILITY LOAD BALANCER GATEWAY

(71) Applicant: Rivada Networks, LLC, Colorado Springs, CO (US)

(72) Inventors: Clint Smith, Warwick, NY (US); Vimal Kumar Mishra, Uttar Pradesh (IN)

(73) Assignee: Rivada Networks, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/713,358

(22) Filed: May 15, 2015

(51) Int. Cl.
*H04W 4/00* (2009.01)
*H04W 8/08* (2009.01)
*H04W 16/10* (2009.01)
*H04W 72/04* (2009.01)
*H04W 36/32* (2009.01)

(52) U.S. Cl.
CPC ............... *H04W 8/08* (2013.01); *H04W 16/10* (2013.01); *H04W 36/32* (2013.01); *H04W 72/0406* (2013.01)

(58) Field of Classification Search
CPC ............... H04W 16/14; H04W 72/04; H04W 28/0226; H04W 28/0231; H04W 28/0289; H04W 28/16; H04W 92/02; H04W 36/0083; H04W 48/18; H04W 72/0406; H04W 72/048; H04W 72/12; H04W 8/18; H04W 8/20; H04W 36/0016; H04W 36/0055; H04W 36/0005; H04W 36/08; H04W 36/04; H04W 36/0066; H04W 88/06; H04W 88/08; H04W 88/16; H04W 36/22; H04W 4/005; H04W 36/165; H04W 72/00; H04W 28/0247; H04W 48/06; H04L 47/10; H04L 5/0058; H04L 41/08; H04L 43/0882
See application file for complete search history.

(56) References Cited

U.S. PATENT DOCUMENTS

| | | | | |
|---|---|---|---|---|
| 8,279,786 B1* | 10/2012 | Smith | ............. | H04W 16/14 370/310 |
| 8,670,403 B2* | 3/2014 | Smith | ............. | H04W 16/14 370/252 |
| 8,711,721 B2* | 4/2014 | Smith | ............. | H04W 16/14 370/252 |
| 2004/0266438 A1* | 12/2004 | Bjelland | ......... | H04W 36/0066 455/437 |
| 2009/0059856 A1* | 3/2009 | Kermoal | ............ | H04W 16/14 370/329 |
| 2013/0053041 A1* | 2/2013 | Li | ..................... | H04L 12/5695 455/437 |

* cited by examiner

*Primary Examiner* — Nimesh Patel
(74) *Attorney, Agent, or Firm* — The Marbury Law Group, PLLC

(57) ABSTRACT

A dynamic spectrum arbitrage (DSA) system includes a dynamic spectrum policy controller (DPC) and a dynamic spectrum controller (DSC) that together dynamically manage the allocation and use of resources (e.g., spectrum resources) across different networks. The DSC component may include wired or wireless connections to a mobility load balancer gateway (MLB gateway) component that is coupled to eNodeBs, a mobility management entity (MME), and various other network components. The MLB gateway may be configured to serve/operate as a gateway that continuously, repeatedly, or dynamically identifies, selects, and assigns an MME to a wireless device and performs various other mobility management operations to coordinate the handling (e.g., handoffs, hand-ins, backoff, etc.) of the wireless devices as it is moved within and in-between networks.

16 Claims, 15 Drawing Sheets

METHODS AND SYSTEM FOR DYNAMIC SPECTRUM ARBITRAGE WITH A MOBILITY LOAD BALANCER GATEWAY

BACKGROUND

With the ever increasing use of wireless communication devices for accessing networks and downloading large files (e.g., video files), there is an increasing demand for radio frequency spectrum. Smart phone users complain about dropped calls, slow access to the Internet and similar problems which are due largely to too many devices trying to access finite radio frequency (RF) bandwidth allocated to such services. Yet parts of the RF spectrum, such as the RF bands dedicated to emergency services (e.g., police, fire and rescue, etc.), go largely unused due to the non-continuous and episodic employment of such voice-radio communication bands. Therefore, improved methods and solutions for dynamically allocating underutilized telecommunication resources (e.g., RF spectrum, etc.) of a first telecommunication network for access and use by wireless devices that subscribe to other networks will be beneficial to the telecommunication networks, service providers, and to the consumers of telecommunication services.

SUMMARY

The various embodiments include a dynamic spectrum arbitrage (DSA) method that includes receiving in a processor a communication message that includes information indicating that a wireless device in a first communication network will commence using a resource in a second communication network, determining a current capacity of each of a plurality of mobility management entity (MME) components in a pool of MMEs, using the determined current capacities of the plurality of MME components to select one MME from the pool of MMEs to manage mobility operations for the wireless device after that wireless device begins using the resource or is handed over to an eNodeB in the second communication network, and sending the received communication message to the selected MME component to cause the wireless device to be assigned to the selected MME component after it begins using the resource or is handed over to the eNodeB in the second communication network.

In an embodiment, determining the current capacity of each of the plurality of MME components in the pool of MMEs includes determining a current workload and remaining processing capacity of an MME component. In a further embodiment, using the determined capacities of the plurality of MME components to select one MME from the pool of MMEs to manage mobility operations for the wireless device after the wireless device is handed over to the eNodeB in the second communication network includes selecting an MME component from the pool of MMEs so as to load balance network traffic across all MMEs in the pool of MMEs.

In a further embodiment, using the determined capacities of the plurality of MME components to select one MME from the pool of MMEs to manage mobility operations for the wireless device after the wireless device is handed over to the eNodeB in the second communication network includes selecting an MME component from the pool of MMEs so as to steer network traffic to an MME component in the pool of MMEs that is determined to have the highest current capacity. In a further embodiment, the method may include receiving updated capacity information for each of the plurality of MME components in the pool of MMEs, determining that the wireless device moved from a first cell site in the second communication network to a second cell site in the second communication network, selecting a new MME component from the pool of MMEs for the wireless device based on the updated capacity information in response to determining that the wireless device moved from the first cell site in the second communication network to the second cell site in the second communication network.

In a further embodiment, the method may include establishing a first communication link between a communications server and a first server in the first communication network, establishing a second communication link between the communications server and a second server in the second communication network, receiving in the communications server a request for resources from the first server, determining in the communications server an amount of resources in the second communication network that available for allocation for use by wireless devices in the first communication network, and allocating a portion of the available resources of the second communication network for access and use by wireless devices of the first communication network, and generating the communication message that includes information indicating that the wireless device in the first communication network will commence using the resource of the second communication network.

Further embodiments may include computing devices that includes various means (e.g., processor, memory, communications circuitry, etc.) for performing functions corresponding to the method operations discussed above.

Further embodiments may include a server computing device that includes a processor configured with processor executable instructions to perform operations including receiving a communication message that includes information indicating that a wireless device in a first communication network will commence using a resource in a second communication network, determining a current capacity of each of a plurality of mobility management entity (MME) components in a pool of MMEs, using the determined current capacities of the plurality of MME components to select one MME from the pool of MMEs to manage mobility operations for the wireless device after the wireless device is handed over to an eNodeB in the second communication network, and sending the received communication message to the selected MME component to cause the wireless device to be assigned to the selected MME component after it is handed over to the eNodeB in the second communication network.

In an embodiment, the processor may be configured with processor-executable instructions to perform operations such that determining the current capacity of each of the plurality of MME components in the pool of MMEs includes determining a current workload and remaining processing capacity of an MME component. In a further embodiment, the processor may be configured with processor-executable instructions to perform operations such that using the determined capacities of the plurality of MME components to select one MME from the pool of MMEs to manage mobility operations for the wireless device after the wireless device is handed over to the eNodeB in the second communication network includes selecting an MME component from the pool of MMEs so as to load balance network traffic across all MMEs in the pool of MMEs.

In a further embodiment, the processor may be configured with processor-executable instructions to perform operations such that using the determined capacities of the plurality of MME components to select one MME from the pool of MMEs to manage mobility operations for the wireless device after the wireless device is handed over to the eNodeB in the second communication network includes selecting an MME component from the pool of MMEs so as to steer network traffic to an MME component in the pool of MMEs that is determined to have the highest current capacity. In a further embodiment, the processor may be configured with processor-executable instructions to perform operations further including receiving updated capacity information for each of the plurality of MME components in the pool of MMEs, determining that the wireless device moved from a first cell site in the second communication network to a second cell site in the second communication network, selecting a new MME component from the pool of MMEs for the wireless device based on the updated capacity information in response to determining that the wireless device moved from the first cell site in the second communication network to the second cell site in the second communication network.

Further embodiments may include a non-transitory computer readable storage medium having stored thereon processor-executable software instructions configured to cause a processor to perform dynamic operations including receiving a communication message that includes information indicating that a wireless device in a first communication network will commence using a resource in a second communication network, determining a current capacity of each of a plurality of mobility management entity (MME) components in a pool of MMEs, using the determined current capacities of the plurality of MME components to select one MME from the pool of MMEs to manage mobility operations for the wireless device after the wireless device is handed over to an eNodeB in the second communication network, and sending the received communication message to the selected MME component to cause the wireless device to be assigned to the selected MME component after it is handed over to the eNodeB in the second communication network.

In an embodiment, the stored processor-executable software instructions may be configured to cause a processor to perform operations such that determining the current capacity of each of the plurality of MME components in the pool of MMEs includes determining a current workload and remaining processing capacity of an MME component. In a further embodiment, the stored processor-executable software instructions may be configured to cause a processor to perform operations such that using the determined capacities of the plurality of MME components to select one MME from the pool of MMEs to manage mobility operations for the wireless device after the wireless device is handed over to the eNodeB in the second communication network includes selecting an MME component from the pool of MMEs so as to load balance network traffic across all MMEs in the pool of MMEs.

In a further embodiment, the stored processor-executable software instructions may be configured to cause a processor to perform operations such that using the determined capacities of the plurality of MME components to select one MME from the pool of MMEs to manage mobility operations for the wireless device after the wireless device is handed over to the eNodeB in the second communication network includes selecting an MME component from the pool of MMEs so as to steer network traffic to an MME component in the pool of MMEs that is determined to have the highest current capacity.

In a further embodiment, the stored processor-executable software instructions may be configured to cause a processor to perform operations further including receiving updated capacity information for each of the plurality of MME components in the pool of MMEs, determining that the wireless device moved from a first cell site in the second communication network to a second cell site in the second communication network, selecting a new MME component from the pool of MMEs for the wireless device based on the updated capacity information in response to determining that the wireless device moved from the first cell site in the second communication network to the second cell site in the second communication network.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
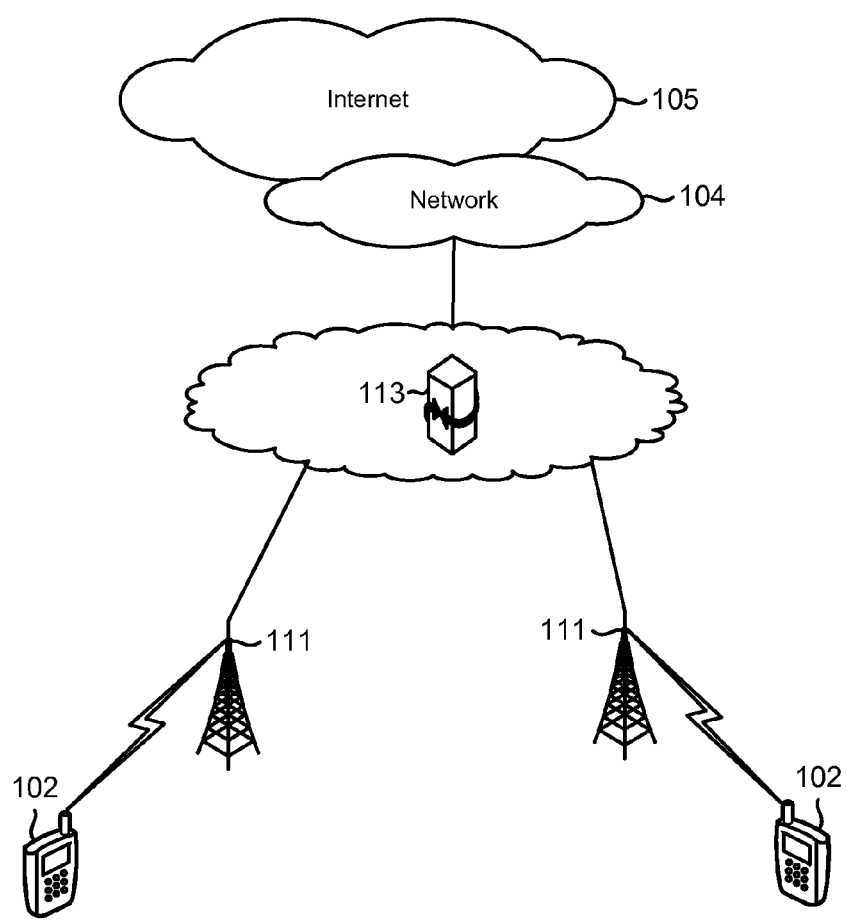
FIGS. 1A through 1C are system block diagrams illustrating various logical and functional components and communication links in communication systems that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device," "wireless device" and "user equipment (UE)" may be used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory. In a preferred embodiment, the wireless device is a cellular handheld device (e.g., a wireless device), which can communicate via a cellular telephone communications network.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.).

With the ubiquity of wireless device ownership and usage, emergency communication via wireless devices using commercial cellular communication networks often are the most efficient and effective means to mobilize emergency response personnel and resources. Enabling wireless devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a wireless device.

Emergency communications over cellular communication networks is not without problems, however. Cellular and other telecommunication networks ("networks") are designed to accommodate access requests from only a fraction of the total number of wireless devices in a particular cell. At times of emergency or crisis, network resources may become overtaxed when predictable human responses to the situation prompt an extraordinary number of wireless device users within a particular cell to access the network at the same time. Wireless device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using wireless devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To overcome these and other limitations of existing solutions, the various embodiments include components configured to provide tiered priority access (TPA) capabilities to deliver quality of service (QoS) and grade of service (GoS) based wireless device communications for first responders. Detailed descriptions of example TPA systems are provided in U.S. Pat. No. 8,275,349 dated Sep. 25, 2102, the entire contents of which are hereby incorporated by reference in their entirety and for all purposes.

In overview, a TPA system or solution may include various components configured to perform various TPA operations to coordinate, make available and/or provide wireless communication resources to high priority users (e.g., emergency personnel) during times of high congestion or in emergency situations. For example, TPA components may be configured to monitor a wireless network's call volume, determine whether the wireless network call volume exceeds a first pre-determined threshold, partition the wireless network resources based on priorities when the wireless network call volume exceeds the first pre-determined threshold, and reserve a portion of the partitioned resources for high priority usage (i.e., use by wireless devices of authorized emergency personnel). The TPA components may be further configured to monitor incoming and outgoing calls to determine whether a call is made from or to an high priority device (e.g., to or from a pre-registered wireless device or wireless devices of authorized emergency personnel), allow general access to the wireless network resources so long as no call is made from or to high priority device, and restrict general access to the wireless network resources in response to determining that a call is made to or from a high priority device. As such, TPA solutions allow telecommunication systems use more the available resources, and ensure that high priority users can access and use the system when needed.

In the various embodiments, these and other TPA operations may be performed in (or in conjunction with) a dynamic spectrum arbitrage (DSA) system configured to dynamically manage the availability, allocation, access, and use of telecommunication resources (e.g., RF spectrum, etc.) between two or more networks (e.g., between a lessor network and a lessee network). A detailed description of an example DSA system is provided in U.S. Pat. No. 8,711,721 dated Apr. 29, 2014, the entire contents of which are hereby incorporated by reference in their entirety and for all purposes.

Briefly, a DSA system may include a dynamic spectrum policy controller (DPC) configured to manage the DSA operations and interactions between two or more networks (e.g., between a lessor network and a lessee network). The DPC may communicate with various network components in a network provider network through one or more dynamic spectrum controller (DSC) components, which may be included in or added to the networks participating in the DSA communications. The DSC component may include wired or wireless connections to eNodeBs, a mobility management entity (MME) component/server, various satellite systems, and other network components. The DSC may communicate with the DPC component to offer, allocate, request, and/or receive resources to and from other networks. This allows two or more networks to collaborate and make better use their resources (e.g., by leasing resources during times of high congestion, leasing out resources when they are not in use, etc.).

The DSA components may be configured to coordinate their operations and communicate information so as to better monitor the locations of the wireless device and make better and more informed DSA decisions. For example, a DSC component may be configured to communicate with an MME component to determine the precise location of a wireless device with respect to a telecommunication resource. The DSC component may use this location information (i.e., precise location of the wireless device) to better identify candidate devices for handoff, handin, backoff, and move-back operations.

In addition, these DSA components may be configured to perform various special functions, individually or in concert, to further support the mobility of wireless devices as they are moved with respect to the available resources and between the participating networks. These special function may include identifying a resource grid, determining a buffer zone for the grid, finding geographical boundaries or boundaries during wireless device mobility, performing inter-network handovers for connected wireless devices, monitoring a wireless device's vicinity, determining whether a wireless device is idle, performing move-back operations for idle devices, determining congestion state changes, handling coverage gaps (due to cell outages or blacklisting during a handin, a handoff, or backoff procedure), identifying operator policies, pre-planning a handin, a handoff or a backoff procedure, and other similar operations.

The DSA components may be configured to perform load balancing operations based on inter-network mobility of the wireless devices, which may be determined based on the location of the wireless device with respect to resources made available by the telecommunication networks. In addition, the various embodiments include DSA components configured to perform mobility load balancing operations to better support intra-network mobility of the wireless devices and reduce congestion at an entrance mobility management entity (MME). For example, the DSA components may include a mobility load balancer (MLB) component that is configured to act as a gateway that continuously or repeatedly identifies and selects a suitable MME component from among a plurality of MMEs in the lessor network for a wireless device that subscribes to a lessee network (and is therefore using leased or allocated resources of the lessor network) as that wireless device is transferred or moved between cell sites or eNodes in the lessor network.

The MLB component may be configured to receive a notification message (e.g., from a DPC, DSC, another MLB component, etc.) that includes information that indicates that resources have been allocated and/or that a wireless device in a first communication network (lessee network) will commence using a resource in a second communication network (lessor network). In response, the MLB component may determine a current or expected MME capacity (e.g., workload, processing capacity, load factor, availability, etc.) of each of a plurality of MME components in a pool of MMEs, and select a suitable MME component from the pool of MMEs to manage mobility operations for use by the wireless device after the wireless device is handed over to an eNodeB in the second communication network. After selecting a suitable MME component, the MLB component may send the received notification message to the selected MME component to cause the wireless device to be assigned to the selected MME component after it is handed over from a first eNodeB in the first communication network to a second eNodeB in the second communication network. The MLB component may monitor the location of the wireless device. If the wireless device is moved between cell sites or eNodeBs in the second communication network, the MLB component may reevaluate its MME selection, and select another suitable MME component from the pool of MMEs to manage mobility operations for use by the wireless device after the wireless device is handed over from the second eNodeB in the second communication network to a third eNodeB in the second communication network. As such, in various embodiments, the MLB component may be configured to perform load balancing operations and mobility management operations for both inter-network mobility and intra-network mobility of wireless devices.

In some embodiments, the MLB component may be configured to intelligently select a suitable MME component from the pool of MMEs based on the determined loads and capacities of the MMEs in the pool. The MLB component may configured to dynamically change or steer network traffic based on MME loads or capacities to improve the functioning and efficiency of the DSA components in the DSA system, thereby improving the performance of the DSA system as a whole. The MLB component may also be configured to allocate or coordinate the movement of traffic from one system or another based on the MME loads/capacities (or the MMEs' knowledge of eNodeB capacities).

In some embodiments, the MLB component may be configured to assign an MME component to a wireless device based on real-time traffic status of the MMEs in a pool of MMEs, the availability of resources, the resources that are required to support the requested QoS profile at the radio and transport bearer servicesk, the type of services that are being delivered, Quality of Service (QoS), available spectrum bandwidth, location of spectrum in the frequency band, geographic zone along with the requested service, congestion control, etc.

In some embodiments, the MLB component may be configured to network activity (e.g., call volume, MME communications, etc.) to determine whether the network activity exceeds any one of a plurality of thresholds. The plurality of thresholds may include any number of thresholds and each threshold may store any value relating to any measurable network activity or event (congestion, bandwidth, usage trends, availability of resources, QoS, etc.). In an embodiment, the plurality of thresholds may include a series of progressive threshold values. For example, the plurality of thresholds may include a first threshold value that is exceeded when 50% of the network resources are in use, a second threshold value that is exceeded when 75% of the network resources are in use, a third threshold value that is exceeded when 85% of the network resources are in use, a fourth threshold value that is exceeded when 95% of the network resources are in use, etc. While the above examples are described with reference specific threshold values, it should be understood that any combination or number of threshold values may be used.

Figure 1B:
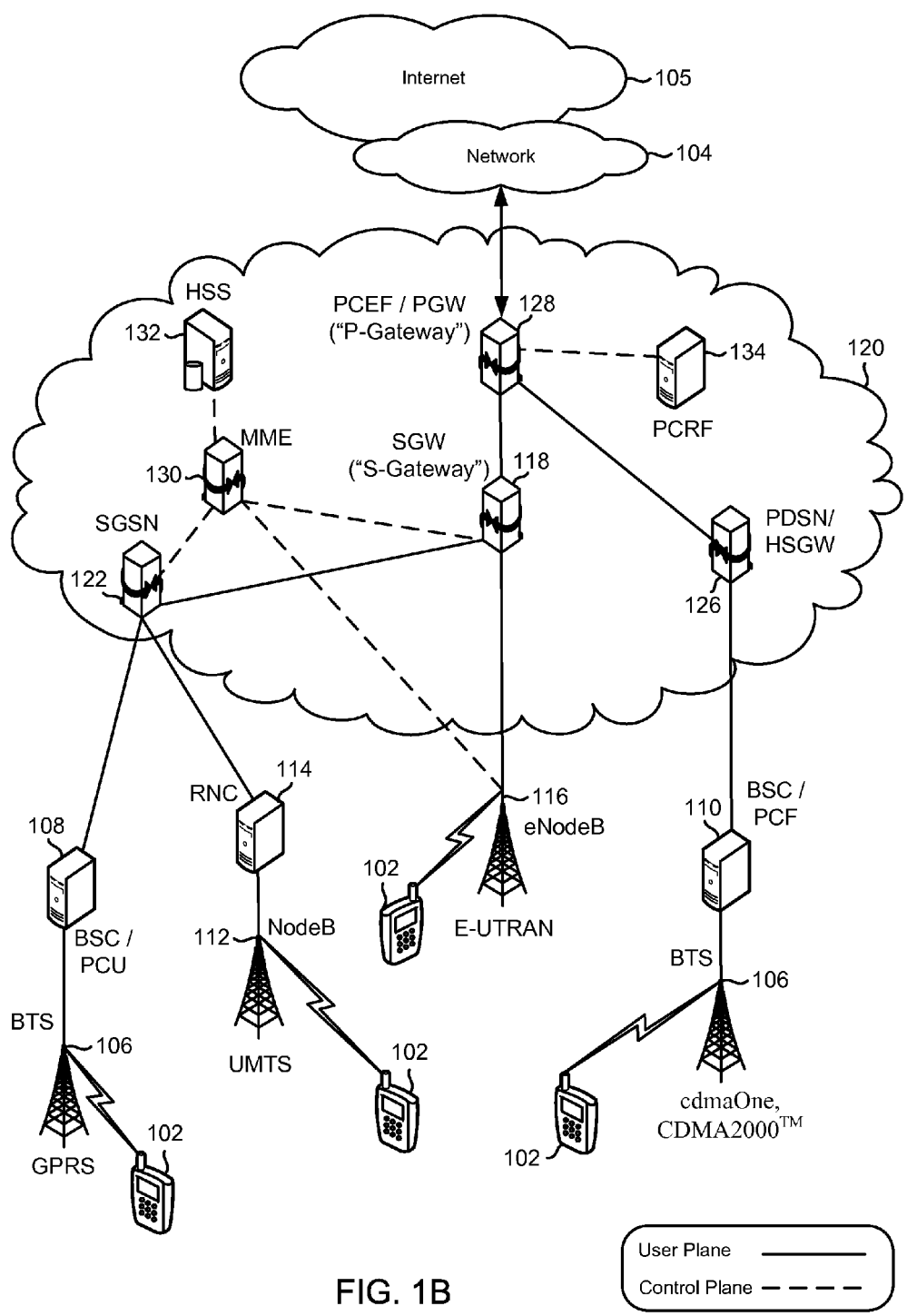
Figure 1C:
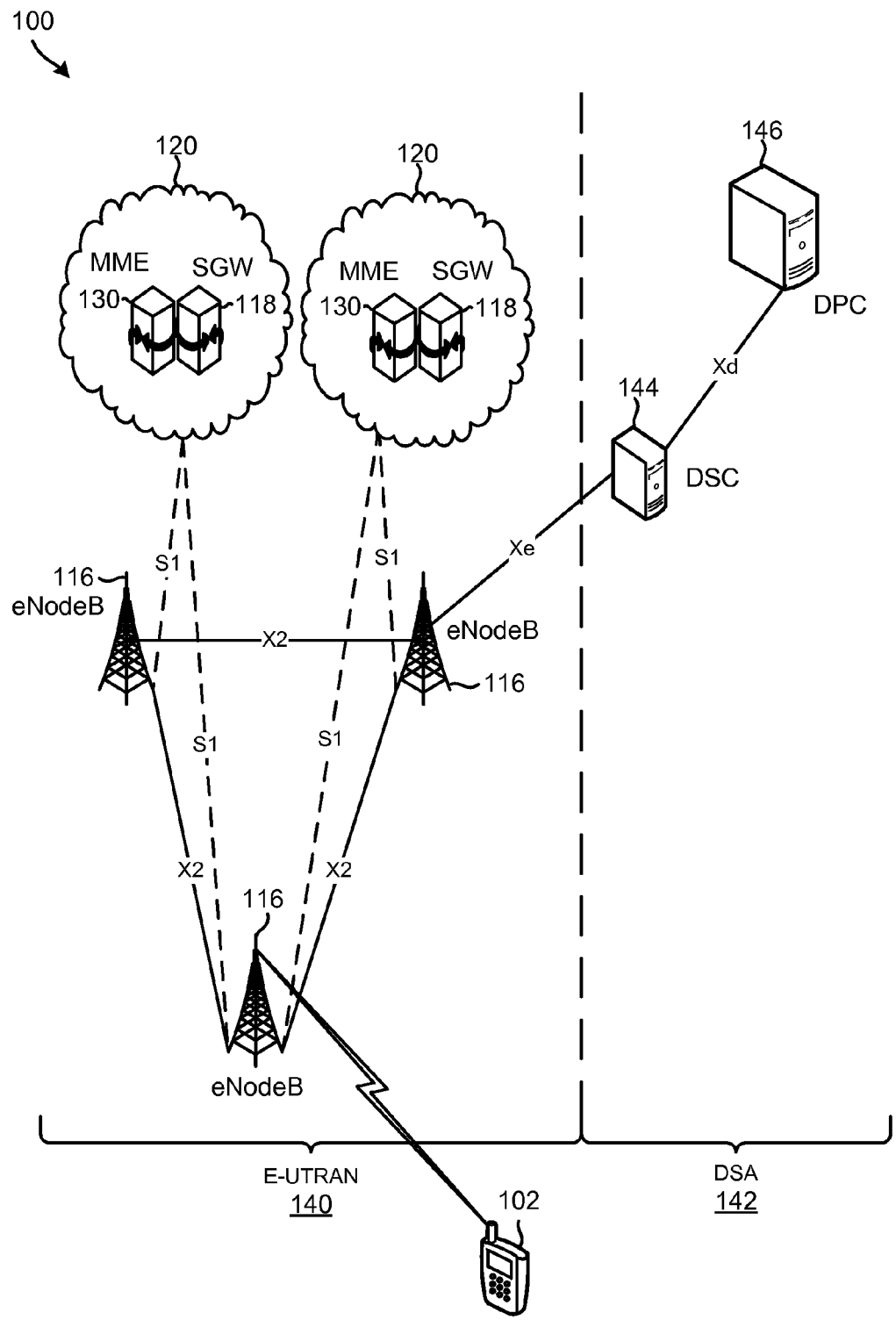

The various embodiments may be implemented within a variety of communication systems, examples of which are illustrated in FIGS. 1A-1C. With reference to FIG. 1A, wireless devices 102 may be configured to transmit and receive voice, data, and control signals to and from a base station 111, which may be a base transceiver station (BTS), NodeB, eNodeB, etc. The base station 111 may communicate with an access gateway 113, which may include one or more of a controller, a gateway, a serving gateway (SGW), a packet data network gateway (PGW), an evolved packet data gateway (ePDG), a packet data serving node (PDSN), a serving GPRS support node (SGSN), or any similar component or combinations of the features/functions provided thereof. Since these structures are well known and/or discussed in detail further below, certain details have been omitted from FIG. 1A in order to focus the descriptions on the most relevant features.

The access gateway 113 may be any logical and/or functional component that serves as the primary point of entry and exit of wireless device traffic and/or connects the wireless devices 102 to their immediate service provider and/or packet data networks (PDNs). The access gateway 113 may forward the voice, data, and control signals to other network components as user data packets, provide connectivity to external packet data networks, manage and store contexts (e.g. network internal routing information, etc.), and act as an anchor between different technologies (e.g., 3GPP and non-3GPP systems). The access gateway 113 may coordinate the transmission and reception of data to and from the Internet 105, as well as the transmission and reception of voice, data and control information to and from an external service network 104, the Internet 105, other base stations 111, and to wireless devices 102.

In various embodiments, the base stations 111 and/or access gateway 113 may be coupled (e.g., via wired or wireless communication links) to a dynamic spectrum arbitrage (DSA) system configured to dynamically manage the availability, allocation, access, and use of various network resources (e.g., RF spectrum, RF spectrum resources, etc.). The DSA system is discussed in detail further below.

FIG. 1B illustrates that wireless devices 102 may be configured to send and receive voice, data and control signals to and from the service network 104 (and ultimately the Internet 105) using a variety of communication systems/technologies (e.g., GPRS, UMTS, LTE, cdmaOne, CDMA2000™), any or all of which may be supported by, or used to implement, the various embodiments.

In the example illustrated in FIG. 1B, long term evolution (LTE) and/or evolved universal terrestrial radio access network (E-UTRAN) data transmitted from a wireless device 102 is received by an eNodeB 116, and sent to a serving gateway (SGW) 118 located within the core network 120. The eNodeB 116 may send signaling/control information (e.g., information pertaining to call setup, security, authentication, etc.) to a mobility management entity (MME) 130. The MME 130 may request user/subscription information from a home subscriber server (HSS) 132, communicate with other MME components, perform various administrative tasks (e.g., user authentication, enforcement of roaming restrictions, etc.), select a SGW 118, and send authorization and administrative information to the eNodeB 116 and/or SGW 118. Upon receiving the authorization information from the MME 130 (e.g., an authentication complete indication, an identifier of a selected SGW, etc.), the eNodeB 116 may send data received from the wireless device 102 to a selected SGW 118. The SGW 118 may store information about the received data (e.g., parameters of the IP bearer service, network internal routing information, etc.) and forward user data packets to a policy control enforcement function (PCEF) and/or packet data network gateway (PGW) 128.

FIG. 1B further illustrates that general packet radio service (GPRS) data transmitted from the wireless devices 102 may be received by a base transceiver station (BTS) 106 and sent to a base station controller (BSC) and/or packet control unit (PCU) component (BSC/PCU) 108. Code division multiple access (CDMA) data transmitted from a wireless device 102 may be received by a base transceiver station 106 and sent to a base station controller (BSC) and/or packet control function (PCF) component (BSC/PCF) 110. Universal mobile telecommunications system (UMTS) data transmitted from a wireless device 102 may be received by a NodeB 112 and sent to a radio network controller (RNC) 114.

The BSC/PCU 108, BSC/PCF 110, and RNC 114 components may process the GPRS, CDMA, and UMTS data, respectively, and send the processed data to a component within the core network 120. More specifically, the BSC/PCU 108 and RNC 114 units may send the processed data to a serving GPRS support node (SGSN) 122, and the BSC/PCF 110 may send the processed data to a packet data serving node (PDSN) and/or high rate packet data serving gateway (HSGW) component (PDSN/HSGW) 126. The PDSN/HSGW 126 may act as a connection point between the radio access network and the IP based PCEF/PGW 128. The SGSN 122 may be responsible for routing the data within a particular geographical service area, and send signaling (control plane) information (e.g., information pertaining to call setup, security, authentication, etc.) to an MME 130. The MME 130 may request user and subscription information from a home subscriber server (HSS) 132, perform various administrative tasks (e.g., user authentication, enforcement of roaming restrictions, etc.), select a SGW 118, and send administrative and/or authorization information to the SGSN 122.

The SGSN 122 may send the GPRS/UMTS data to a selected SGW 118 in response to receiving authorization information from the MME 130. The SGW 118 may store information about the data (e.g., parameters of the IP bearer service, network internal routing information, etc.) and forward user data packets to the PCEF/PGW 128. The PCEF/PGW 128 may send signaling information (control plane) to a policy control rules function (PCRF) 134. The PCRF 134 may access subscriber databases, create a set of policy rules and performs other specialized functions (e.g., interacts with online/offline charging systems, application functions, etc.). The PCRF 134 may then send the policy rules to the PCEF/PGW 128 for enforcement. The PCEF/PGW 128 may implement the policy rules to control the bandwidth, the quality of service (QoS), the characteristics of the data, and the services being communicated between the service network 104 and the end users.

In the various embodiments, any or all of the components discussed above (e.g., components 102-134) may be coupled to, or included in, a DSA system configured to dynamically manage the availability, allocation, access, and use of telecommunication resources.

FIG. 1C illustrates various logical components and communication links in a system 100 that includes an DSA system 142 and a evolved universal terrestrial radio access network (E-UTRAN) 140. In the example illustrated in FIG. 1C, the DSA system 142 includes a dynamic spectrum controller (DSC) 144 component and a dynamic spectrum policy controller (DPC) 146 component. The E-UTRAN 140 includes a plurality of interconnected eNodeBs 116 coupled to the core network 120 (e.g., via a connection to an MME, SGW, etc.). In some embodiments, the DSC 144 may be included in or coupled to the E-UTRAN 140, either as part of its core network 120 or outside of the core network 120. In an embodiment, the DSC 144 may be coupled directly (e.g., via wired or wireless communication links) to one or more of the eNodeBs 116.

The DPC 146 and DSC 144 components may be configured to communicate via an interface that is implemented in, or provided via, a dynamic spectrum arbitrage application part (DSAAP) protocol/module/component, which may be configured to allow, facilitate, support or augment communications between various DSA components (e.g., DPC 146, DSC 144, etc.). For example, the DSC 144 may be configured to communicate with the DPC 146 via an Xd interface/reference point using the DSAAP protocol.

The eNodeBs 116 may be interconnected, and configured to communicate via an X2 interface/reference point using the DSAAP protocol. The eNodeBs 116 may be configured to communicate with the DSC 144 via the Xe interface/reference point, which may use the DSAAP protocol, TR-069 protocol, and/or TR-192 data model extensions (e.g., to support listing available resources at the eNodeB 116, notify the eNodeB 116 of bid/buy confirmations, etc.). The eNodeBs 116 may be configured to communicate with components in the core network 120 via the S1 interface. For example, an eNodeB 116 may be connected to an MME 130 via the S1-MME interface, and connected to a SGW 118 via the S1-U interface.

The eNodeBs 116 may act as a bridge (e.g., layer 2 bridge) between the wireless devices 102 and the core network 120 by serving as the termination point of all radio protocols towards the wireless devices 102, and relaying voice (e.g., VoIP, etc.), data, and control signals to network components in the core network 120. The eNodeBs 116 may also be configured to perform various radio resource management operations, which may include controlling the usage of radio interfaces, allocating resources based on requests, prioritizing and scheduling traffic according to various quality of service (QoS) requirements, monitoring the usage of network resources, and performing other similar operations. In addition, in some embodiments, the eNodeBs 116 may be configured to collect radio signal level measurements, analyze the collected radio signal level measurements, and handover wireless devices 102 (or connections to the mobile devices) to other base stations (e.g., a second eNodeB) based on the analysis of the collected radio signal level measurements.

The eNodeBs 116 may be configured to monitor network activity (e.g., call volume, resource usage, congestion, number of active connections, etc.) to determine whether the network activity exceeds two or more thresholds. When the network activity exceeds a first threshold, the eNodeBs 116 may reserve a communication channel for the wireless device 102. When the network activity exceeds a second (or subsequent) threshold, the eNodeBs 116 may dynamically "shape" the network activity. Shaping the network activity may include performing operations to control one or more characteristics of the wireless communication links and/or the data being communicated, such as reducing bandwidth, reducing QoS, restricting the number of services, shedding a connection, transferring a connected device to another eNodeB, performing handoffs, etc.

There are a number of advantages to shaping the network activity of the wireless devices via the eNodeB 116, including faster detection and response times, improved efficiency, and more focused application of solutions. For example, since the eNodeB 116 is outside of the core network, it may be able detect and respond to changes in network activity much faster than the components. In an addition, the eNodeB 116 may respond to changes in network activity and/or resource availability on a cell-by-cell or tower-by-tower basis, as opposed to applying the changes to an entire geographical area, updating network wide policies/controls, or applying restrictions to a specific subscriber or mobile device.

The MME 130 may be configured to perform various operations to provide the system with various functions, including non-access stratum (NAS) signaling, NAS signaling security, access stratum (AS) security control, inter-CN node signaling for mobility between 3GPP access networks, idle mode UE reach-ability (including control and execution of paging retransmission), tracking area list management (e.g., for a wireless device in idle and active mode), PGW and SGW selection, MME selection for handovers with MME change, SGSN selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization. The MME 130 may also be configured to send/communicate device state and attach/detach status information to/with the DSC 144 component.

Figure 2A:
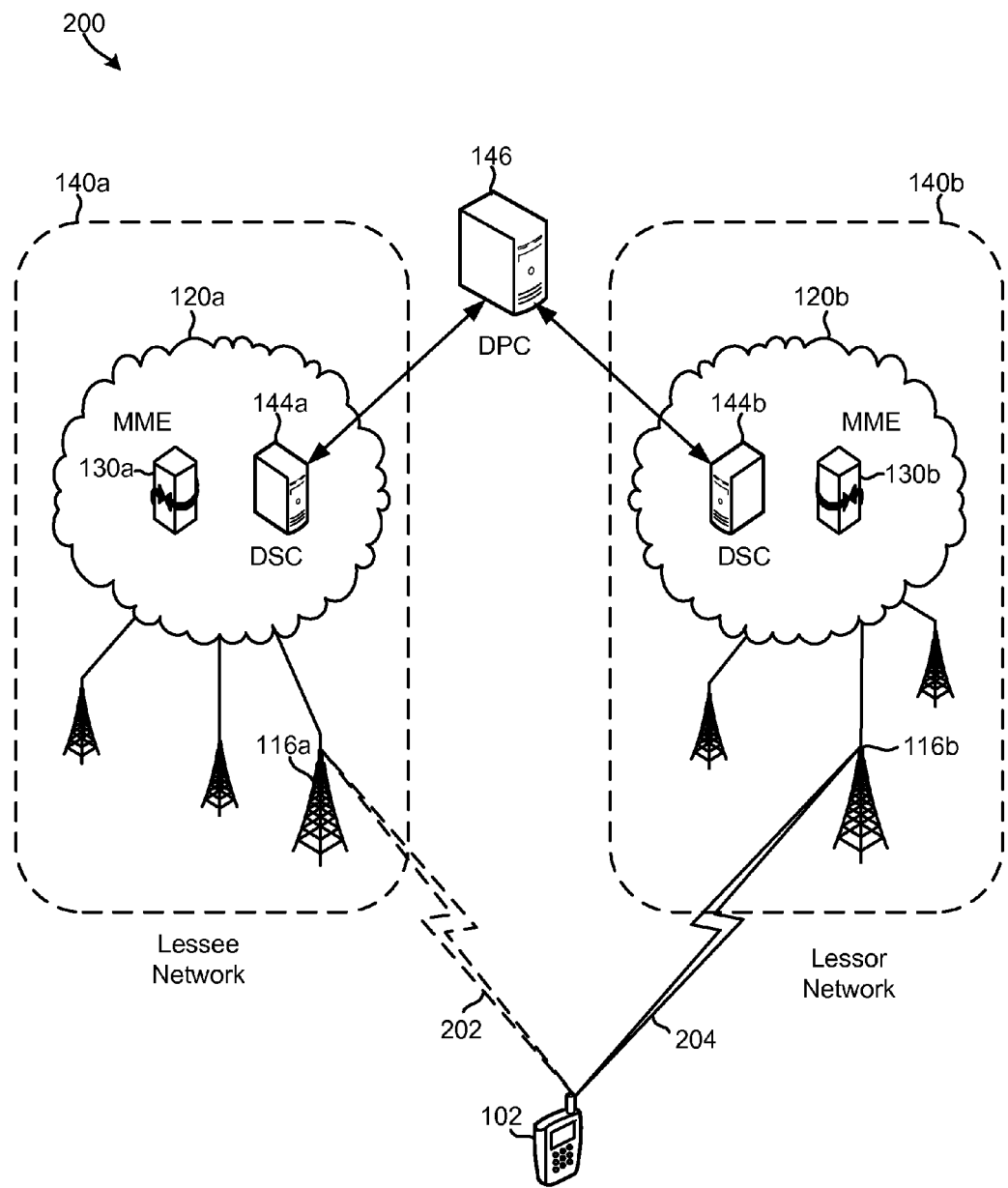
FIG. 2A is a system block diagram illustrating various components in a dynamic spectrum arbitrage (DSA) system configured to dynamically allocate resources of a first network for access and use by wireless devices of a second network in accordance with various embodiments.

FIG. 2A illustrates network components and information flows in an example communication system 200 that includes two E-UTRANs 140a, 140b interconnected via a DPC 146 that is configured to manage DSA operations and interactions between the E-UTRANs 140a, 140b. Each E-UTRAN 140a, 140b may include a core network 120a, 120b, an eNodeB 116a, 116b, an MME 130a, 130b, and a DSC 144a, 144b. The DSCs 144a, 144b may also be connected, directly or indirectly, to various network components in their respective core networks 120a, 120b, such as a PCRF 134, HSS 132 and a PCEF/PGW 128 (not illustrated in FIG. 2). The DSCs 144a, 144b may be connected to the eNodeBs 116a, 116b via direct or indirect communication links. The wireless device 102 may be a lessee wireless device that subscribes to the lessee network or E-UTRAN 140a. Said another way, E-UTRAN 140a may be the home network for the wireless device 102.

The DSCs 144a, 144b may be configured to send information regarding the availability of spectrum resources (e.g., information received from an eNodeB, MME, PCRF, PCEF, PGW, etc.) to the DPC 146. The DPC 146 may be configured to receive and use such information to intelligently allocate, transfer, manage, coordinate, or lease the resources (e.g., the available radio frequency spectrum resources) of the second E-UTRAN 140b for access and use by wireless device subscriber of the first E-UTRAN 140a. For example, the DPC 146 may be configured to coordinate the allocation of spectrum resources to the first E-UTRAN 140a (i.e., lessee network) from the E-UTRAN 140b (i.e., lessor network) as part of the dynamic spectrum arbitrage operations. Such operations may allow a wireless device 102 that is wirelessly connected to the eNodeB 116a in the first E-UTRAN 140a (e.g., via a communication link 202) to be handed off to the eNodeB 116b in the second E-UTRAN 140b. As part of this handoff procedure, the wireless device 102 may establish a new connection 204 to the eNodeB 116b in the second E-UTRAN 140b, terminate the wireless connection 202 to the original eNodeB 116a, and use the allocated resources of the second E-UTRAN 140b as if they are included in the first E-UTRAN 140a. These DSA and/or handoff operations may be performed so that the wireless device 102 maintains a data connection to (or a data connection that is managed by) the original (lessee) network after the wireless device 102 is handed off to the eNodeB 116b in the second E-UTRAN 140b.

Figure 2B:
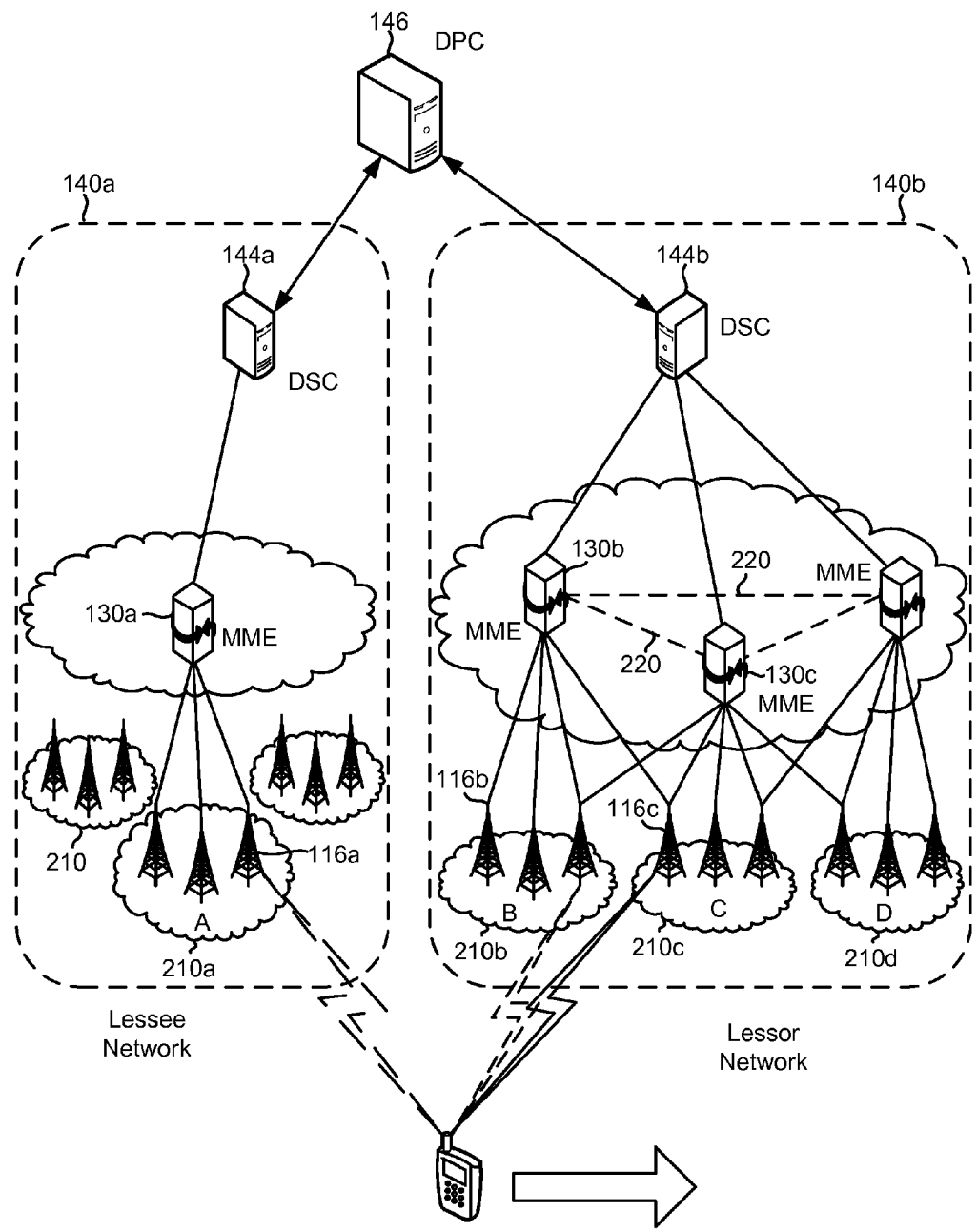
FIG. 2B is a system block diagram illustrating components and communication links in a DSA system configured to manage wireless device mobility between cell sites in accordance with an embodiment.

FIG. 2B illustrates that each of the two E-UTRANs 140a, 140b may include multiple cell sites 210 (e.g., cell sites 210a through 210d) that each include one or more eNodeBs 116. Each cell site 210 and/or eNodeB 116 may be associated with a specific MME 130 component (or a specific cluster of MME components). For example, eNodeB 116b in a first cell site 210b of the second E-UTRAN 140b may be associated with MME 116b, whereas the eNodeB 116c in the second cell site 210c of the second E-UTRAN 140b may be associated with a different MME 116c.

As part of the above-described dynamic spectrum arbitrage operations, the DPC 146 may allocate resources of the second E-UTRAN 140b (i.e., lessor network) for access and use by a wireless device 102 that subscribes to the first E-UTRAN 140a (i.e., lessee network). The wireless device 102 may be transferred from the MME 130a in the first E-UTRAN 140a to the MME 130b (or MME cluster) in the second E-UTRAN 140b. The first MME 130b (or MME cluster) in the second E-UTRAN 140b to which the wireless device 102 connects (or is pinned) is known as the "entrance MME" of that wireless device 102. The entrance MME continues to operate as the primary and/or anchor MME for its associated (or pinned) devices and processes all of the handover traffic signaling during the entire time that the session remains active. In this example, the entrance MME continues to operate as the primary/anchor MME for its associated devices, even after those devices are moved, transferred or handed-over to a different cell site 210.

As an example, After the wireless device 102 is moved from a first cell site 210b in the second E-UTRAN 140b (i.e., lessor network) to a second cell site 210c of that network (e.g., due to the device being physically moved from one geographic area to another, etc.), the wireless device 102 may be handed off or transferred from the eNodeB 116b in the first cell site 210b to an eNodeB 116c in the second cell site 210c. Since MME 130b is the entrance MME for the wireless device 102, it continues to operate as the primarily MME for the wireless device 102. As a result, all or many of the signaling communications between eNodeB 116c and MME 116c for that wireless device 102 are routed to MME 130b (i.e., back to the entrance MME), which may be accomplished via inter-MME communication links 220.

The routing of the signaling communications back to a the entrance MME may generate a significant amount of network traffic and/or consume limited resources (e.g., bandwidth, etc.) of the networks. Further, since many wireless devices may use the same MME as their entrance MME, one MME component in the network may be overloaded/congested while other MMEs in that same network remain underutilized.

Figure 2C:
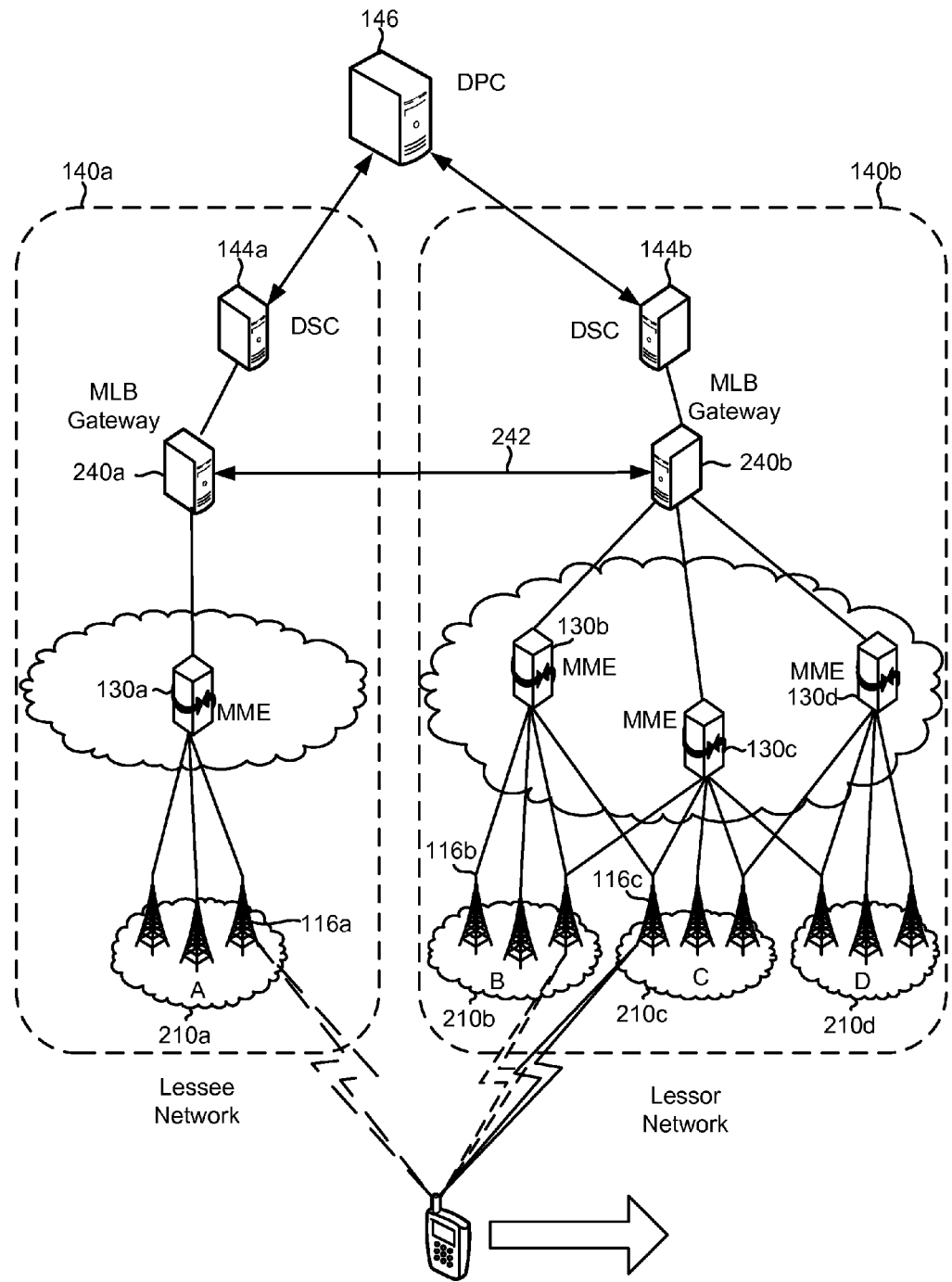
FIG. 2C is a system block diagram illustrating components and communication links in a system that includes a mobility loading balancing gateway configured the manage wireless device mobility between cell sites in accordance with the various embodiments.

FIG. 2C illustrates a system that includes mobility load balancer gateway (MLB gateway) components configured to perform load balancing operations in accordance with the various embodiments. In the example illustrated in FIG. 2C, the first E-UTRAN 140a (or lessee network) includes a first DSC 144a component, a first MLB gateway 240a component, an MME 130a component, and a cell site 210a that includes an eNodeBs 116a. The second E-UTRAN 140b (or lessor network) includes a second MLB gateway 240b component, a second DSC 144b component, a plurality of MMEs 130b-130d, and a plurality of cell sites 210b-210d that each include one or more eNodeBs 116a-116d.

The first MLB gateway 240a component may be coupled to the first DSC 144a component via wired or wireless communication links or channels. The second MLB gateway 240b component may be coupled to the second DSC 144b component via wired or wireless communication links or channels. The first MLB gateway 240a component may be coupled to the second MLB gateway 240b component via a gateway communication link 242, which may be a wired or wireless communication link or channel.

Each of the MLB gateway 240a, 240b components may be configured to serve/operate as a gateway that continuously, repeatedly, or dynamically identifies, selects, and assigns an MME 130 to a wireless device 102. For example, the MLB gateway 240b component in the lessor network (i.e., E-UTRAN 140b) may be configured to receive an incoming handover signaling message (originating in the lessee network) via the DSC 144b component. In response, the MLB gateway 240b component may determine the current load (e.g., processing workload, signaling traffic, number of associated devices, etc.) on each of its associated MMEs 130b-130d, perform load balancing operations to select an MME 130 that is the best-suited (e.g., the most underutilized, etc.) to manage the mobility operations for the wireless device 102, and forward the received handover signaling message to the selected MME component so as to cause that wireless device 102 to assign, attach, pin, or use to the selected MME component as its primary MME. In the example illustrated in FIG. 2C, the wireless device 102 is in the first cell site 210b, and the MLB gateway 240b component first assigns the wireless device 102 to MME 130b.

When the wireless device 102 is moved or transferred from a first cell site 210b to a second cell site 210c (e.g., due to the device being physically moved, handed over, etc.), the MLB gateway 240b component may again determine the current loads of MMEs 130b-130d, perform load balancing operations to determine which of the MMEs 130b-130d is the best-suited MME, and reassign the wireless device 102 to the best-suited MME. Thus, the MLB gateway 240b may be configured to perform other mobility management operations so as to assign and reassess the wireless device 102 to any available MME component, as needed. As a result, an MME 130b that is designated as the "entrance MME" is not required to remain the primary or anchor MME for the wireless device 102 during the entire time that the session remains active.

The MLB gateway 240b component improves the performance and functioning of the DSA system, and reduces the probability that an MME 130 component will become overloaded or fail. Further, as the lessee wireless device 102 moves within the lessor network, the MLB gateway 240b serves as the anchor MME so as to facilitate both common and coordinated connections between the lessee and lessor networks for S10 signaling. The MLB gateway 240b also load balances the signaling traffic/communications in the network, reduces the volume of signaling communications between different MME 210b-210 in the same network, and allows the lessor network to better manage and better utilize its network assets and resources. In addition, the MLB gateway 240b may distribute the workload across all of the MMEs in a pool of MMEs, steer network traffic to MMEs that are underutilized, or steer network traffic away from MMEs that are determined to be more likely or susceptible to experiencing an overload condition.

Each MLB gateway 240a, 240b (or operator network gateway) may connect to a number of MMEs 130 in its network, support a number of difference interfaces (e.g., S10, S3 etc.), and perform various operations to support inter-RAT and intra-RAT handovers. When deployed in an LTE network, an MLB gateway 240 may allow an eNodeB 116 to connect to a pool of MMEs (e.g., MMEs 130b-130d). Further, the MLB gateway 240 may load balance signaling communications for an incoming wireless device 102 (i.e., a wireless device handed over from the lessee network, etc.) by assigning the wireless device 102 to the best-suited MME in the pool of MMEs.

In some embodiments, the system may be configured so that when an eNodeB 116 executes s1 setup procedure with an MME 130, it receives s1 setup response message from the MME 130 with an "Relative MME Capacity" information element (IE) that includes information identifying the MME's workload, capacity, load factor, availability, and/or other information that may be used to perform loading balancing operations to distribute the workload across all of the MMEs in a pool of MMEs, steer network traffic to MMEs that are underutilized, or steer network traffic away from overloaded (or nearly overloaded) MMEs.

The MME capacity of each MME 130 (e.g., the MME's workload, processing capacity, load factor, availability) may change dynamically. As such, each of the MMEs 130 may be configured to monitor changes in their MME capacity and inform their associated eNodeBs 116 and/or their MLB gateway 240 about such changes. For example, an MME 130 may be configured to generate and send a "Relative MME Capacity" information element (IE) to their associated eNodeBs 116 each time there is a material or significant change in that MME's workload, capacity, load factor, availability, etc. The eNodeB 116 may use this MME capacity information to manage current and future handover operations. The eNodeB 116 may also send the MME capacity information to an associated DSC 144 and/or MLB gateway 240 component, either of which may send/forward the information to a MLB gateway 240 component in another network.

In some embodiments, the eNodeBs 116 may be configured to select an appropriate MME 130 for signaling communications other than handover (e.g., signaling required to perform the attach procedure, service request procedure, etc.). For example, if a cell site 210 is served by more than one MME 130, the eNodeB 116 may use the information included in the "Relative MME Capacity" information element (IE) to select an MME 130 based on its MME capacity or load factor. The eNodeB may then forward an attach message to the selected MME 130.

In some embodiments, each MME 130 may be configured inform/send the "Relative MME Capacity" information element (or information identifying changes to its workload/capacity) to its associated MLB gateway 240. Further, an MLB gateway 240 may request and receive signals or communication messages from an EMS/NMS that indicates there are changes to the workload or capacity of one or more MMEs 130. A MLB gateway 240 may also request/fetch the "Relative MME Capacity" information element (IE) from an MME 130, such as in response to receiving a signals from an EMS/NMS.

The MLB gateway 204b may store information identifying the cells or eNodeBs 113 that are served each of the MMEs 130b-130d. The MLB gateway 204b may receive such information dynamically, as static configuration information, or a combination thereof. Static configuration information may be sent/provided to MLB gateway 204b through an OAM, EMS, NMS, etc. In a dynamic environment, when a new cell or eNodeB 113 connects to an MME, that MME may send the information identifying the new cells or eNodeBs 113 to the MLB gateway 204b via communication link or channel. In implementation based on the particular vendors Core Network used a combination of the static and dynamic allocations may be employed.

To balance the load between different MMEs in then network when handing-over a wireless device between the lessee and lessor networks, MLB gateway may connect to pool of MMEs (e.g., MMEs 130b-130d) so as to allow a cell or eNodeB to be served by a subset of the components in the MME pool.

Figure 3:
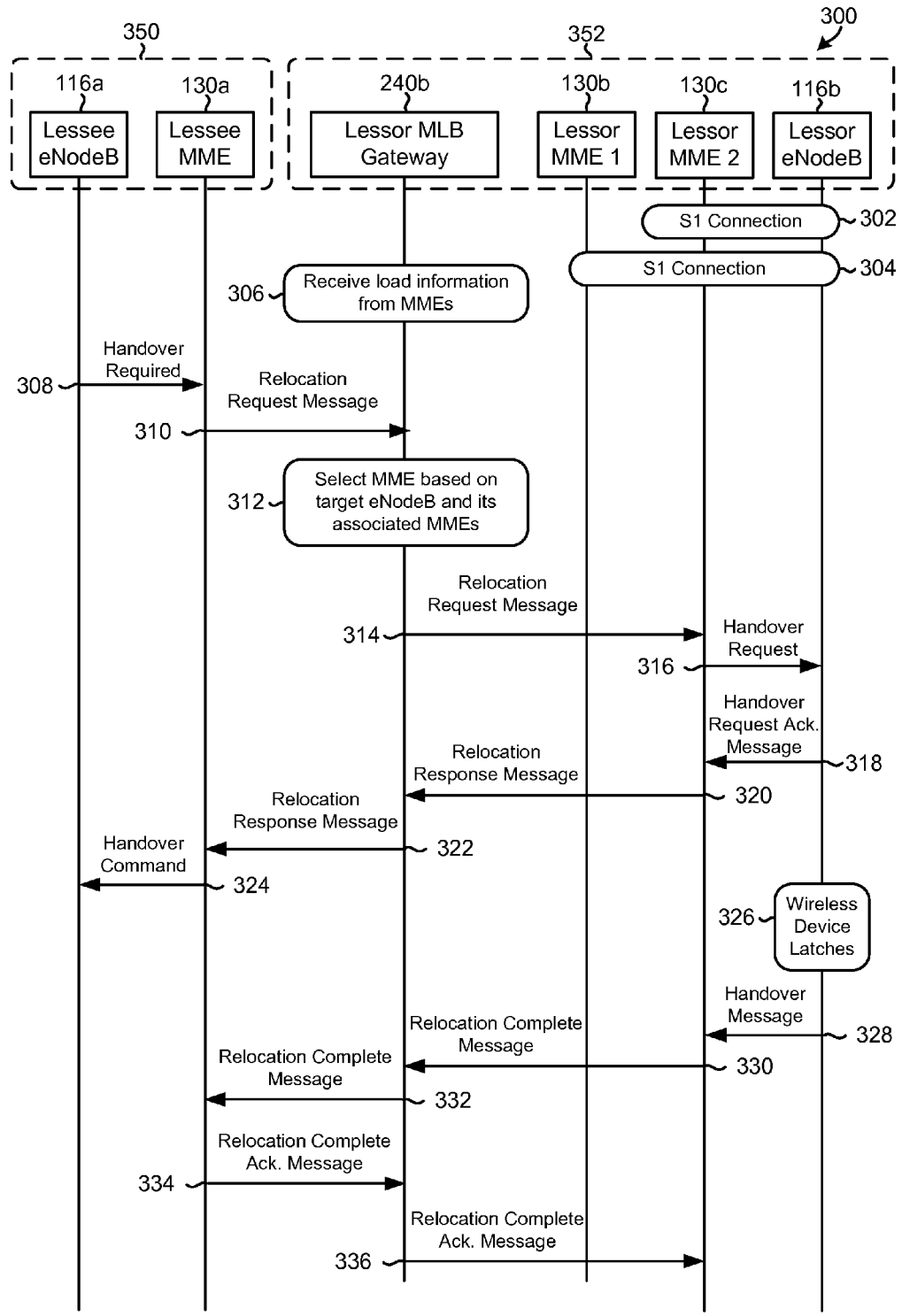
FIG. 3 is a message flow diagram illustrating message communications between components of a DSA communication system that includes mobility loading balancing gateway in accordance with an embodiment.

FIG. 3 illustrates various components and message flows in an embodiment system 300 that includes an MLB gateway configured to intelligently and dynamically select and assign MME components to wireless devices. In the example illustrated in FIG. 3, the system 300 includes a lessee network 350 and a lessor network 352. The lessee network 350 includes a lessee eNodeB 116a component and a lessee MME 130a component. The lessor network 352 includes a lessor MLB gateway 204b component, a first lessor MME 130b component, a second lessor MME 130c component, and a lessor eNodeB 116b component. The lessor MLB gateway 204b component may be configured to maintain a session temporarily while performing handover signaling operations and/or maintain a session till a wireless device is transferred or handed over to the lessor network.

In operation block 302, the lessor eNodeB 116b component and the second lessor MME 130c component may establish an S1-connection via the S1 interface (e.g., via the S1-MME interface, etc.). In operation block 304, the lessor eNodeB 116b component may establish another S1-connection interface (e.g., via the S1-MME interface, etc.) to the first lessor MME 130b component.

In operation block 306, the lessor MLB gateway 204b component may receive load information from the first and second lessor MMEs 130b, 130c. For example, in operation block 306, the lessor MLB gateway 204b receive one or more "Relative MME Capacity" information elements that include information identifying the current and/or predicted workloads/capacities of the lessor MMEs 130b, 130c.

In various embodiments, the lessor MLB gateway 204b component may receive current load of an MME by fetching the current load of MME when it receives initial handover message from other network and/or fetching the current load of MME periodically and considering the latest received and stored MME capacity information (e.g., load factor, etc.) to forward the initial incoming handover signaling. The lessor MLB gateway 204b component may also periodically receive load information from all the connected MMEs. In addition, the MMEs may be configured to send the load information when a wireless device registers to the MMEs via handover, attach procedures, service request etc. In some embodiments, the MMEs may be configured to send the load information to the lessor MLB gateway 204b component each time that the state of an associated wireless device transitions from EMM-DEREGISTERED to EMM-REGISTERED or from EMM-REGISTERED to EMM-DEREGISTERED.

In some embodiments, the MMEs may be configured to send the load information to a DSC in response to determining that a threshold value has been reached, crossed or beached. In these embodiments, the lessor MLB gateway 204b component may be configured to use an operator-defined or alternative algorithm (e.g., round robin algorithm, algorithm based on MME priorities, etc.) to perform load balancing for incoming handover signaling messages until the threshold value has been reached, crossed or beached.

In some embodiments, the MMEs may be configured to send the load information in response to determining that a set of configured threshold values have been reached, crossed or beached in the system. For example, an MME having threshold1 (60% of MME capacity), threshold2 (70% of MME capacity) and threshold3 (90% of MME capacity) may send its load information to the lessor MLB gateway 204b component three times (i.e. when threshold) is crossed, threshold2 is crossed, and threshold3 is crossed). These thresholds may be crossed in the up or down direction. For example, the MMEs may be configured to send the load information if the MME's load factor decreases to less than 90% (i.e. it crossed threshold3).

Returning to FIG. 3, in operation 308, a processor of the lessee eNodeB 116a component may generate and send a handover communication message to the lessee MME 130a component to initiate DSA handover operations. In operation 310, a processor of the MLB gateway 240b component may receive a relocation request communication message from the lessee MME 130a component (e.g., via a DPC, DSC, MLB gateway in the lessee network, etc.). The relocation request communication message may be a handover communication message and/or include information identifying a target cell/eNodeB in the lessor network to which the wireless device is to be transferred/handed over. The MLB gateway 240*b* component may then identify the target MME or MMEs that are associated with the target cell/eNodeB.

In operation block 312, the MLB gateway 240*b* component may select the best-suited or most appropriate MME from the target MMEs in the pool of MMEs (e.g., the first and second lessor MMEs 130*b*, MME 130*c*) based on the target cell/eNodeB and the workloads of the available MMEs. In the example illustrated in FIG. 3, the MLB gateway 240*b* component selects the second lessor MME 130*c* component as the best-suited or most appropriate MME. In operation 314, the MLB gateway 240*b* may send the relocation request message to the selected MME (i.e., the second lessor MME 130*c* component).

In operation 316, the second lessor MME 130*c* component may use the information included in the relocation request message generate and send a handover request message to the lessor eNodeB 116*b* component. In operation 318, the lessor eNodeB 116*b* component may generate and send a handover request acknowledgment message to the second lessor MME 130*c* component. In operation 320, the second lessor MME 130*c* may generate and send a relocation response message to the MLB gateway 240*b*.

In operation 322, the MLB gateway 240*b* may send the relocation response message to the lessee MME 130*a* component. In operation 324, the lessee MME 130*a* component may send a handover command to the lessee eNodeB 116*a* for forwarding to a wireless device. After receiving the handover command, the wireless device may latch on to the lessor eNodeB 116*b* component (i.e., to the target eNodeB) in operation block 326.

In operation 328, the lessor eNodeB 116*b* component may generate and send a handover communication message to the second lessor MME 130*c* component. In operation 330, the second lessor MME 130*c* component may generate and send a relocation complete message to the MLB gateway 240*b*. In operation 332, the MLB gateway 240*b* may send the relocation complete message to the lessee eNodeB 116*a* component. In operation 334, the lessee eNodeB 116*a* component may generate and send a relocation complete acknowledgment message to the MLB gateway 240*b*. In operation 336, the MLB gateway 240*b* may send the relocation complete acknowledgment message to the second lessor MME 130*c* component.

Figure 4:
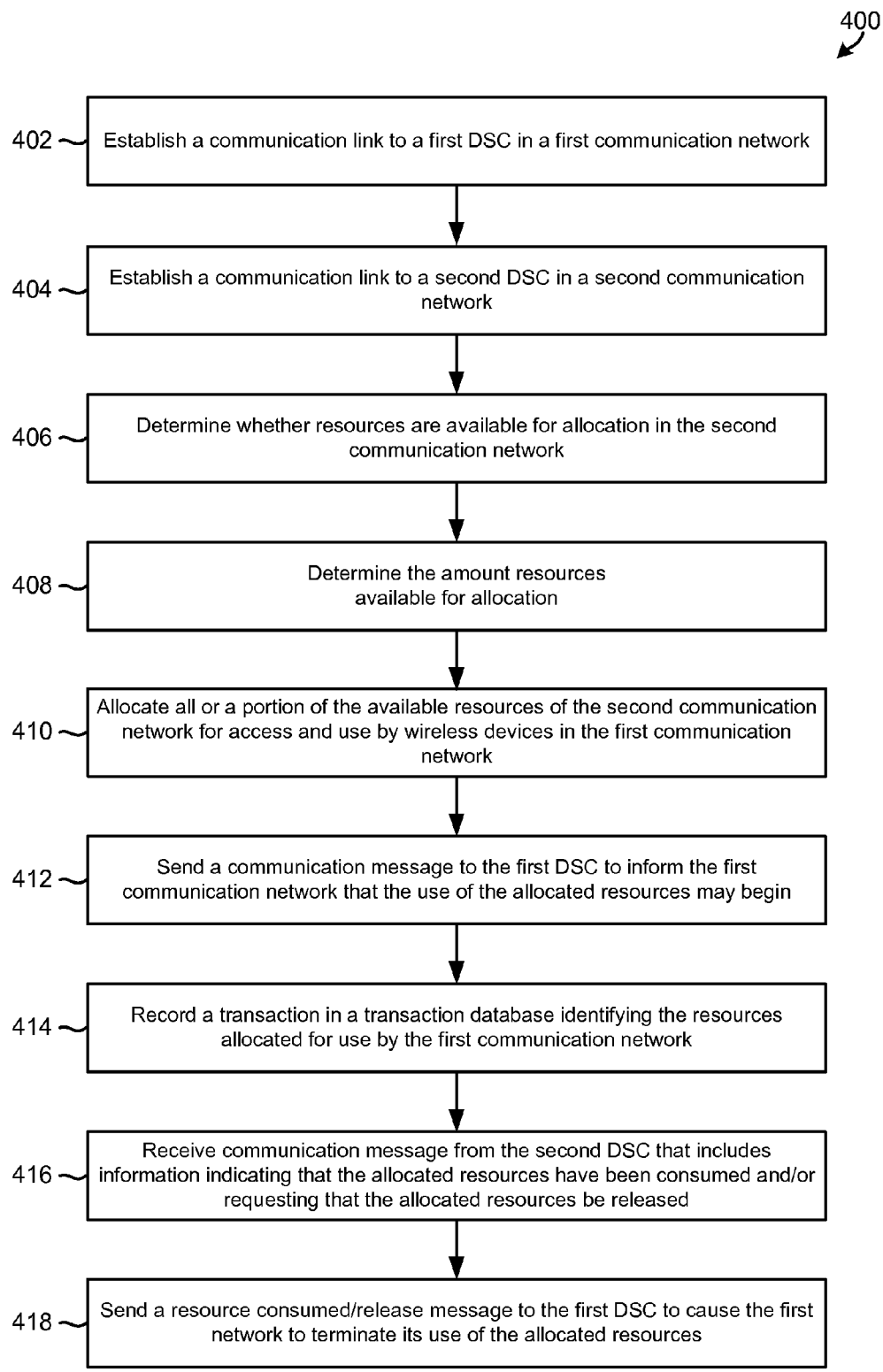
FIGS. 4 through 6 are process flow diagrams illustrating DSA methods of allocating resources in accordance with various embodiments.

FIG. 4 illustrates an example DSA method 400 of allocating resources in accordance with an embodiment. Method 400 may be performed by a processing core in a DPC 146 component (e.g., server computing device, etc.). In block 402, the DPC 146 may establish a first communication link to a first DSC 144*a* in a first communication network (e.g., E-UTRAN, etc.). In block 404, the DPC 146 may establish a second communication link to a second DSC 144*b* in a second communication network. In block 406, the DPC 146 may determine whether radio resources are available for allocation within the second communication network. In some embodiments, this may be accomplished by using the DSAAP protocol to communicate with a DSC 144 in the second communication network via the second communication link, which may be a wired or wireless communication link.

In block 408, the DPC 146 may determine the amount of resources that are available for allocation. In block 410, the DPC 146 may perform various operations to allocate all or a portion of the available resources of the second communication network for access and use by wireless devices 102 in the first communication network. In some embodiments, in block 410, the first and second communication networks may perform any or all of operations of method 300 illustrated in FIG. 3. As part of these operations, DPC 146 may send a relocation request message (or a "forward relocation request message") to a MLB gateway 240 in the second communication network. Alternatively or in addition, a MLB gateway 240 in the first communication network may send the relocation request message to the MLB gateway 240 in the second communication network in block 408.

Returning to FIG. 4, in block 412, the DPC 146 may send a communication message to the first DSC 144*a* (e.g., by using the DSAAP protocol) to inform the first communication network that the use of the allocated resources may begin. In block 414, the DPC 146 may record a transaction in a transaction database identifying an amount of RF spectrum resources allocated for use by the first communication network.

In block 416, the DPC 146 may receive a communication message from the second DSC 144*b* that includes information indicating that the allocated resources have been consumed and/or requesting that the allocated resources be released. In block 418, the DPC 146 may send a resource consumed/release message to the first DSC 144*a* to cause the first network to terminate its use of the allocated resources.

Figure 5:
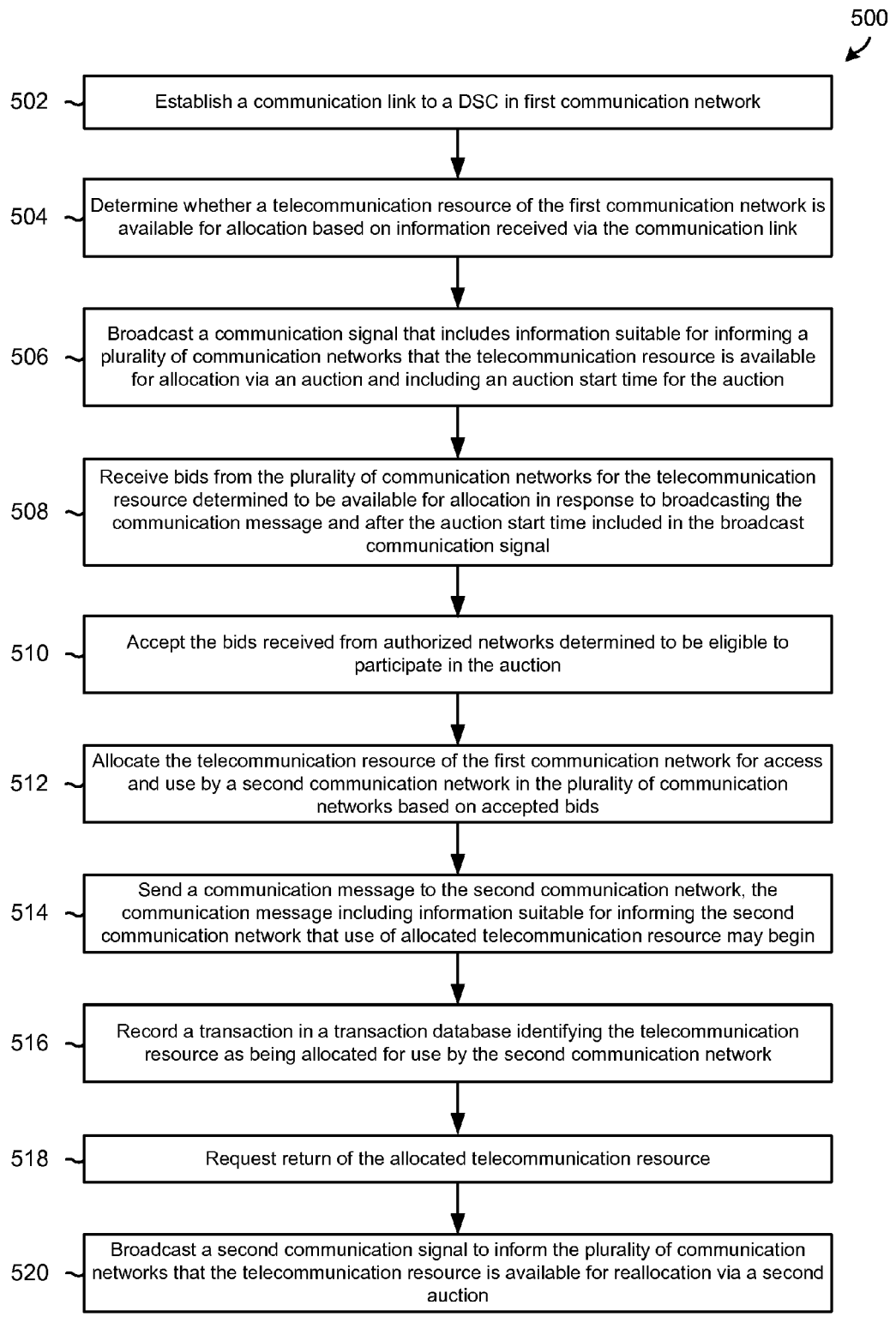

FIG. 5 illustrates another DSA method 500 of allocating resources in a first communication network for access and use by a second communication network. The operations of DSA method 500 may be performed by a processor or processing core of a DPC 146 component. In block 502, a DPC 146 component may establish a communication link to a DSC 144*a* in first communication network. In block 504, the DPC 146 may determine whether a telecommunication resource of the first communication network is available for allocation based on information received via the communication link. In an embodiment, the DPC 146 may determine that the telecommunication resource is available for allocation at a future date and time.

In block 506, the DPC 146 may broadcast a communication signal that includes information suitable for informing a plurality of communication networks that the telecommunication resource is available for allocation via an auction and including an auction start time for the auction. In block 508, the DPC 146 may receive bids from the plurality of communication networks for the telecommunication resource determined to be available for allocation in response to broadcasting the communication message and after the auction start time included in the broadcast communication signal. In an embodiment, receiving bids from the plurality of communication networks may include receiving bids for access and use of the telecommunication resource determined at the future date and time.

In block 510, the DPC 146 may accept only the bids received from authorized networks determined to be eligible to participate in the auction. For example, the DPC 146 may determine whether the telecommunication resource is compatible with each of the plurality of communication networks, authorize networks in the plurality of communication networks as being eligible to participate in the auction based on their compatibility with the telecommunication resource, and accept bids from only the authorized networks.

In block 512, the DPC 146 may allocate the telecommunication resource of the first communication network for access and use by a second communication network in the plurality of communication networks based on accepted bids. In an embodiment, allocating the telecommunication resource may include allocating the telecommunication resource of the first communication network for access and use by the second communication network at the future date and time. In some embodiments, in block 512, components in the first and second communication networks may perform any or all of operations of method 300 illustrated in FIG. 3. For example, a DPC 146 may send a relocation request message (or a "forward relocation request message") to a MLB gateway 240 in the second communication network in block 512, the MLB gateway 240 may determine the current load (e.g., processing workload, signaling traffic, number of associated devices, etc.) on each MME in a pool of MMEs, perform load balancing operations, etc.

In block 514, the DPC 146 may send a communication message to the second communication network that includes information suitable for informing the second communication network that use of allocated telecommunication resource may begin. In block 516, the DPC 146 may record a transaction in a transaction database identifying the telecommunication resource as being allocated for use by the second communication network. In block 518, the DPC 146 may request return of the allocated telecommunication resource. In block 520, the DPC 146 may broadcast a second communication signal to inform the plurality of communication networks that the telecommunication resource is available for reallocation via a second auction.

Figure 6:
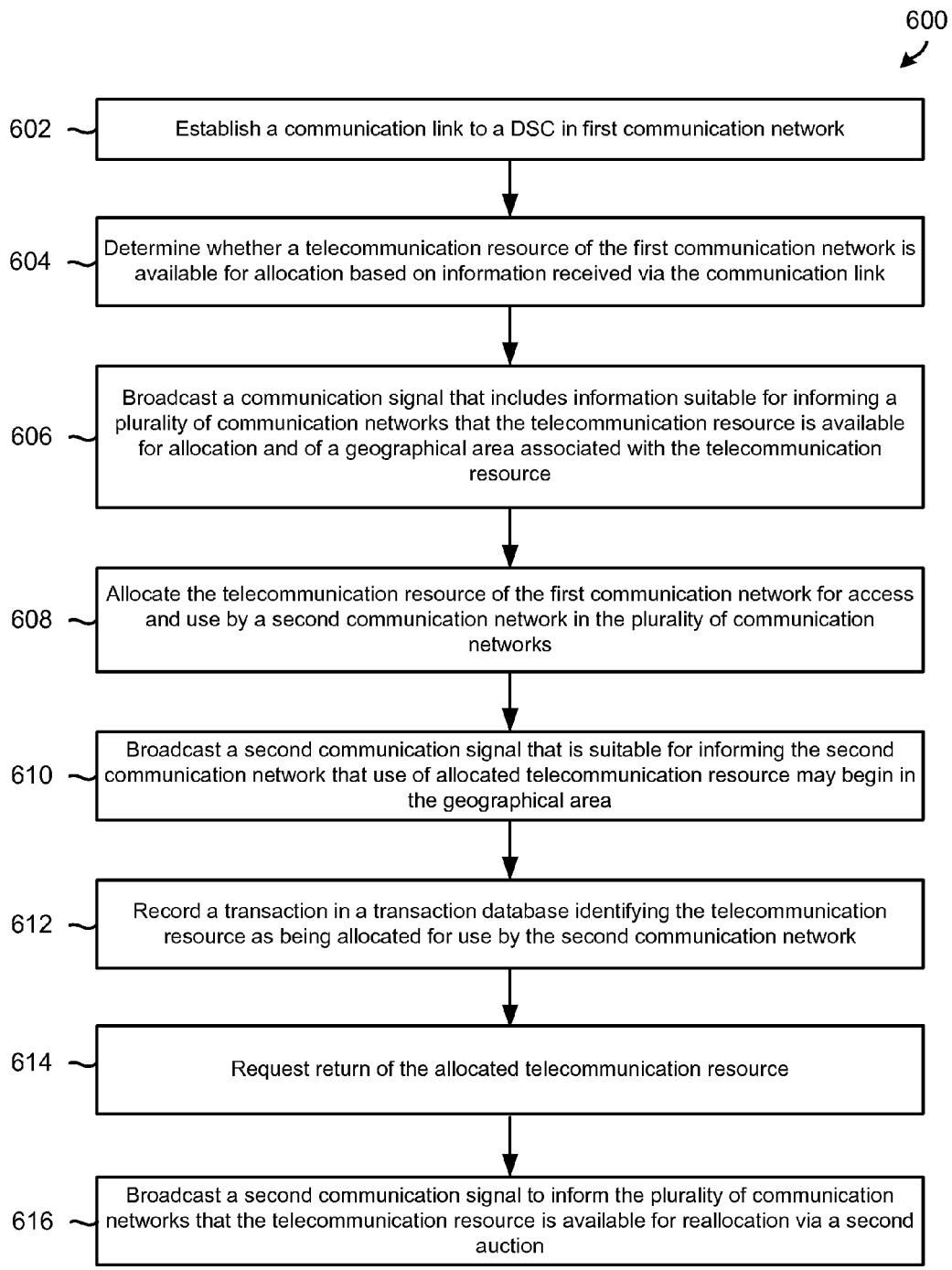

FIG. 6 illustrates yet another DSA method 600 of allocating resources in a first communication network for access and use by a second communication network. The operations of DSA method 600 may be performed by a processor or processing core of a DPC 146 component. In block 602, the DPC 146 component may establish a communication link to a DSC 144a in first communication network. In block 604, the DPC 146 component may determine that a resource in a first communication network is available for allocation. In block 606, the DPC 146 component may broadcast a first communication signal informing a plurality of communication networks that the resource is available for allocation and of a geographical area associated with the resource. In block 608, the DPC 146 component may allocate the resource of the first communication network for access and use by a second communication network in the plurality of communication networks. In block 610, the DPC 146 component may broadcast a second communication signal informing the second communication network that use of allocated telecommunication resource may begin in the geographical area. In block 612, the DPC 146 component may record a transaction in a transaction database identifying the telecommunication resource as being allocated for use by the second communication network. In some embodiments, as part of the operations in blocks 608 through 612, components in the first and second communication networks may perform any or all of operations of method 300 illustrated in FIG. 3.

In block 614, the DPC 146 component may request return of the allocated telecommunication resource. In block 616, the DPC 146 may broadcast a second communication signal to inform the plurality of communication networks that the telecommunication resource is available for reallocation via a second auction.

In an embodiment, the DSA method 600 may further include the DPC 146 component receiving resource configuration information relating to a resource allocation scheme from a first DSC 144 in the first communication network and sending the resource configuration information to a second DSC 144 in the second communication network.

In a further embodiment, the DSA method 600 may include the DPC 146 component receiving coordination information relating to availability of the telecommunication resource based on geographical areas from the first DSC 144 and sending the coordination configuration information to the second DSC 144. In a further embodiment, the DPC 146 component may be configured to negotiate a resource leasing scheme between the first and second communication networks for a use of the resource, and coordinating a handover of a mobile device between the first and second communication networks based on geographic boundaries defined in the resource leasing scheme. The DPC 146 may be further configured to determine the validity of a subscriber device (e.g., wireless device 102) of the second communication network based on the proximity of the subscriber device to the geographical area, level of quality of service available to the subscriber device, and/or information included in the resource leasing scheme.

In various embodiments, the DPC 146 may be configured to instruct the subscriber device to change networks or to establish a communication link to a resource in the first communication network based on the proximity of the subscriber device to the geographical area, level of quality of service available to the subscriber device, and/or terms of the resource leasing scheme. The DPC 146 may be configured to instruct a subscriber device that is actively connected to or using the telecommunication resource to change networks and/or to attach to another resource based on the proximity of the subscriber device to the geographical area.

Figure 7:
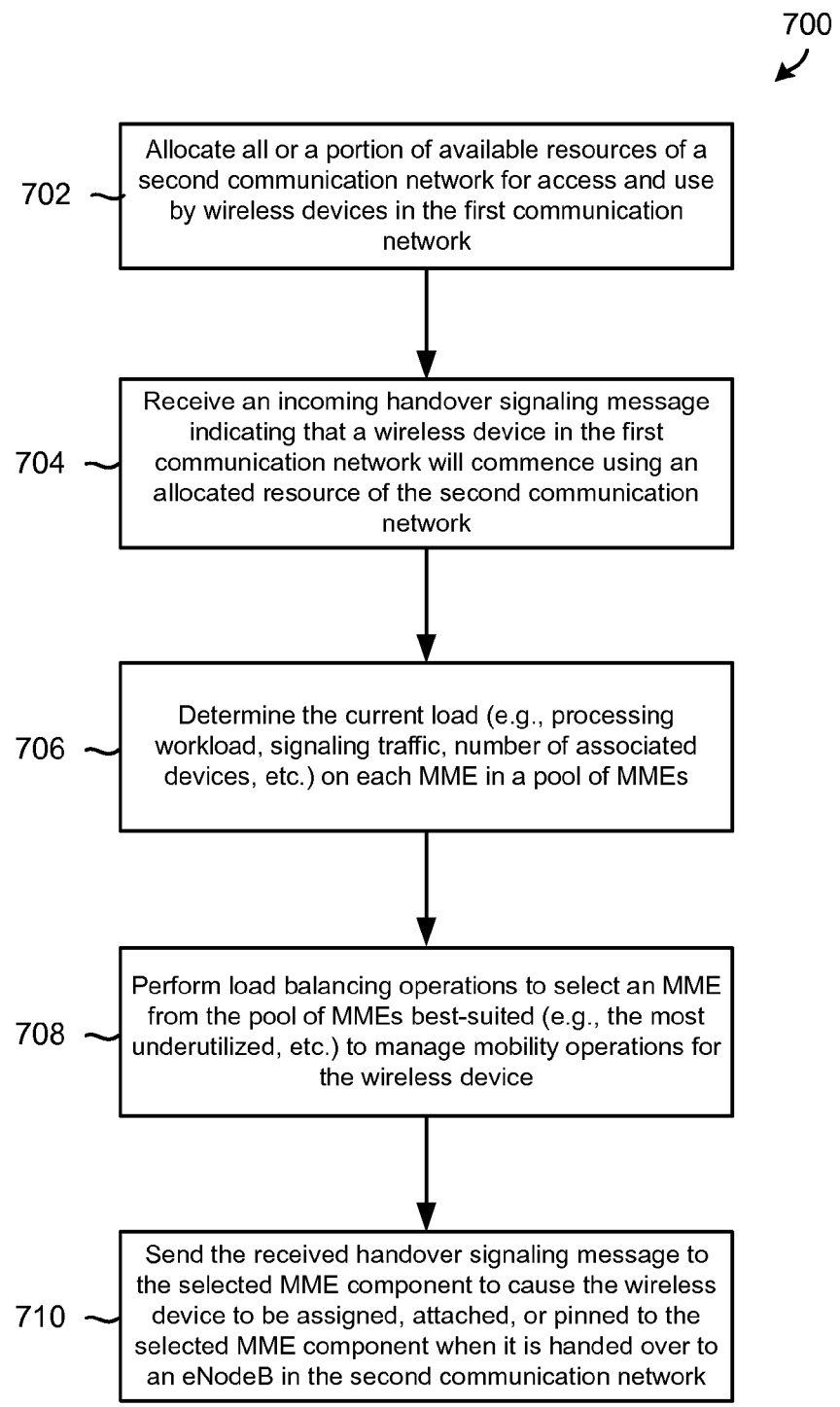
FIG. 7 is a process flow diagram illustrating a method of managing wireless device mobility between cell sites in accordance with an embodiment.

FIG. 7 illustrates an embodiment DSA method 700 for assigning a wireless device to an MME component. All or portions of the operations of DSA method 700 may be performed by a processor or processing core of a MLB gateway 240 component. In block 702, a DPC component may allocate all or a portion of available resources of a second communication network for access and use by wireless devices in the first communication network. In block 704, the MLB gateway 240 component may receive an incoming handover signaling message indicating that a wireless device in the first communication network will commence using an allocated resource of the second communication network. In block 706, the MLB gateway 240 component may determine the current load (e.g., processing workload, signaling traffic, number of associated devices, etc.) on each MME in a pool of MMEs. In block 708, the MLB gateway 240 component may perform load balancing operations to select an MME from the pool of MMEs best-suited (e.g., the most underutilized, etc.) to manage mobility operations for the wireless device. In block 710, the MLB gateway 240 component may send the received handover signaling message to the selected MME component to cause the wireless device to be assigned, attached, or pinned to the selected MME component when it is handed over to an eNodeB in the second communication network.

Various embodiments may include or use a dynamic spectrum arbitrage application part (DSAAP) protocol and/or component that is configured to allow, facilitate, support, or augment communications between two or more DSA components (e.g., DPC, DSC, eNodeB, MME, HSS, etc.) so as to improve the efficiency and speed of the DSA system. A DSA component may be any component discussed in this application and/or any component that participates in any of the DSA operations, communications, or methods discussed in this application. As such, the DSAAP component(s) may be configured to allow, facilitate, support, or augment communications between any of the components discussed in this application, including the communications between a DPC component and a DSC component, between the DSC component and a eNodeB component, between the DSC component and an MME component, between the DSC component and an HSS component, between the MME component and the HSS component, between the eNodeB component and a wireless device, etc.

To facilitate the communications between two or more DSA components, the DSAAP component(s) may publish application programming interfaces (API) and/or include client modules that facilitate communications between the DSA components. In addition, the DSAAP component(s) may be configured to allow the DSA components to communicate specific information, use specific communication messages, and/or perform specific operations that together provide various DSA functions that further improve the efficiency and speed of the DSA system and participating networks.

As an example, the DSAAP component(s) may be configured to allow an eNodeB to communicate with a DSC component (e.g., via the Xe interface), with other eNodeBs (e.g., via an X2 interface), and with various other components (e.g., via the S1 interface). As a further example, the DSAAP component(s) may be configured to allow, facilitate, support, or augment communications between the DSC component and the DPC component so as to allow the DPC and/or DSC components to better pool resources across the different networks, better monitor traffic and resource usage in the various networks, to more efficiently communicate bids and bidding information, to quickly and efficiently register and deregister components, and better perform backoff operations. The DSAAP component(s) may also improve the DSA resource auctioning operations by improving the performance and efficiency of the procedures for bidding, generating invoices, advertizing resources, requesting resources, purchasing resources, validating bid credentials, etc.

In the various embodiments, all or portions of the DSAAP component may be included in one or more DSA components, such as a DPC component, a DSC component, an eNodeB component, an MME component, and an HSS component. The DSAAP component may be implemented in hardware, software, or a combination of hardware and software. In an embodiment, the DSAAP component may be configured to implement a DSAAP protocol, which may be defined over the Xe, Xd, and/or X2 reference points. In various embodiments, the Xe reference point between DSC and eNodeB may use the DSAAP protocol, TR-069 protocol, and/or TR-192 data model extensions to support listing available resources at the eNodeB and notifying the eNodeB of bid/buy confirmations. The Xd reference point between DSC and DPC may use the DSAAP protocol for dynamic spectrum and resource arbitrage operations. The X2 interface/reference point between the eNodeBs may also use the DSAAP protocol to communicate information.

In various embodiments, the DSAAP component(s) may be configured to allow the various DSA components (e.g., DSC, DPC, eNodeB, etc.) to communicate using the DSAAP protocol and/or to perform various DSAAP methods. DSAAP methods may be performed in any of the DSA systems discussed in this application, such as a system that includes a first DSC server in a first telecommunication network (e.g., a lessee network), a second DSC server in second telecommunication network (e.g., a lessor network), and a DPC server that is outside of the first and second telecommunication networks.

In an embodiment, the DSA components (e.g., DPC 146, DSC 144, MLB gateway 240, etc.) may be configured to perform mobility management operations to better manage and coordinate the handling (e.g., handoffs, hand-ins, backoff, etc.) of wireless devices 102 as these devices are moved with respect to the available resources, such as resources of their home network, resources allocated by another network, and collocated resources. Performing mobility management operations may include the DSC 144, DPC 146, and/or MLB gateway 240 components communicating with a wireless device 102, eNodeB 116, MME 130, and/or HSS 132 to determine the locations of wireless devices 102. Performing mobility management operations may also include the MLB gateway 240 component communicating with one or more MMEs 130 in a pool of MMEs.

FIGS. 8A through 8D illustrate various methods for monitoring the locations of wireless devices 102 in accordance with various embodiments. The methods illustrated in FIGS. 8A through 8D may be performed by processing cores in a wireless device 102, eNodeB 116, MME 1130, HSS 132, MLB gateway 240, and/or a DSC 144.

Figure 8A:
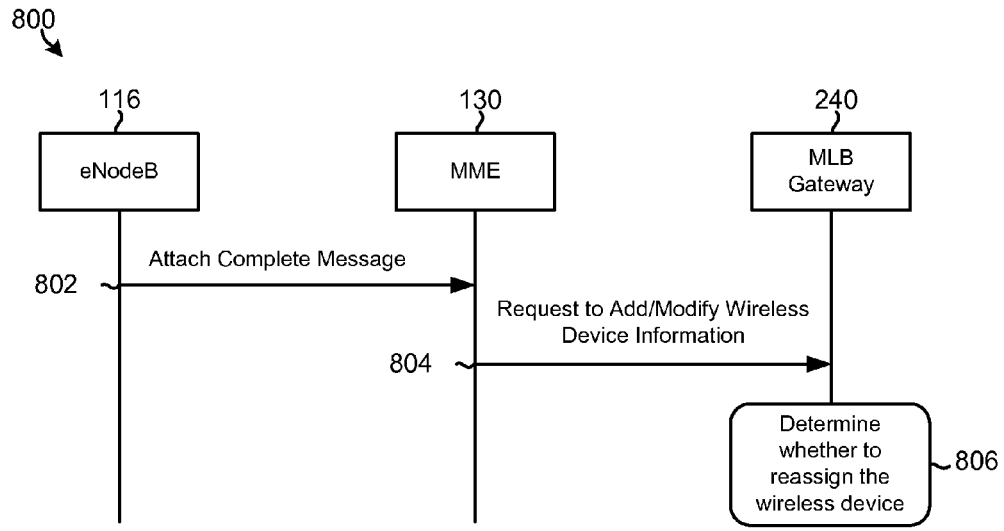
FIGS. 8A through 8D are message flow diagrams illustrating methods for monitoring the locations of wireless devices to update location records and determine whether to reassign a wireless device to a new MME in accordance with various embodiments.

FIG. 8A illustrates a method 800 of adding or updating the location information of a wireless device 102 when it attaches to an eNodeB 116. In operation 802 the eNodeB 116 may send an "attach complete" message to the MME 130 to indicate that a new wireless device 102 has initiated an attach procedure and/or has successfully attached to the eNodeB 116. In operation 804, the MME 130 may send a request to add or modify wireless device information to a MLB gateway 240 for recording and forwarding to a DSC 144. In operation block 806, the MLB gateway 240 may receive the request message and use the information included in the received request message to add or update the location information and/or database records of the wireless device 102, and determine whether to reassign the wireless device 102 to another MME. The MLB gateway 240 may send this information to a DSC 144, which may use this location information to better allocate or use its telecommunication resources (e.g., by better selecting a target eNodeB for handovers, etc.).

Figure 8B:
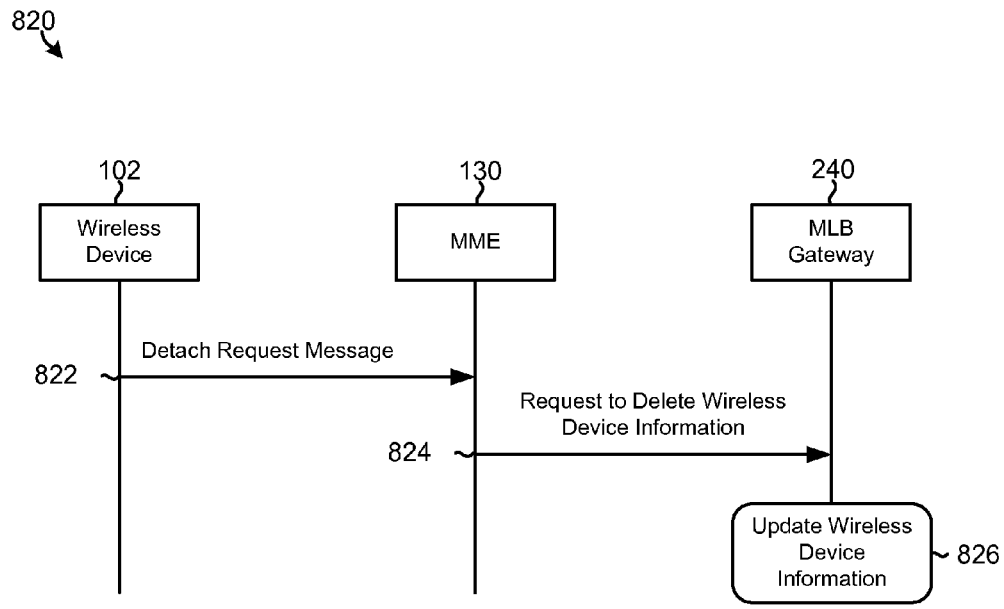

FIG. 8B illustrates a method 820 of updating/deleting location information for a wireless device 102 in response to a device or eNodeB initiated detach procedure. In operation 822, a wireless device 102 may send a detach request message to the MME 130, either directly or via an eNodeB 116. In another embodiment, an eNodeB 116 may be configured to send the detach request message to the MME 130 in response to determining that the wireless device 102 has initiated a detach procedure, has been dropped, has been terminated, or is otherwise no longer attached to that eNodeB 116. In operation 824, the MME 130 may send a request to delete wireless device information to the MLB gateway 240. In operation block 826, the MLB gateway 240 may use the information included in the received request message to update/remove a location record for the wireless device 102. The MLB gateway 240 may also send the information to a DSC 144, which may use the information to delete a location record associated with the wireless device 102 to indicate that the wireless device 102 is no longer using network resources (e.g., the eNodeB 116).

Figure 8C:
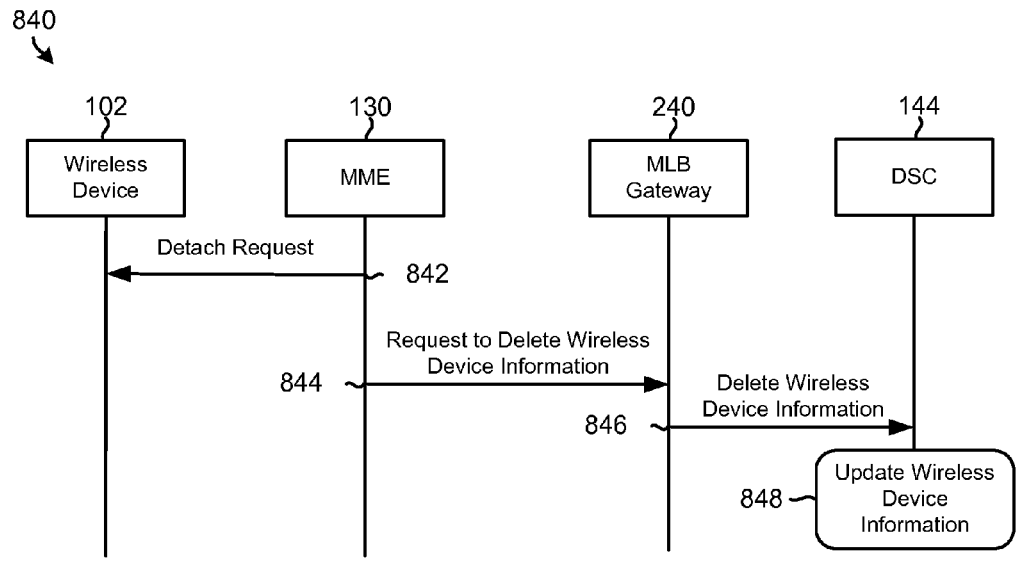

FIG. 8C illustrates a method 840 of updating/deleting location information for a wireless device 102 in response to detecting a MME-initiated detach procedure. In operation 842, the MME 130 may send a detach request message to a wireless device 102, either directly or via an eNodeB 116, to commence an MME-initiated detach procedure. In operation 844, the MME 130 may send a request to delete wireless device information to the MLB gateway 240, which may update its records and forward the message to a DSC 144 in operation 846. In operation block 848, the DSC 144 may receive and use the request message (or information included in the received request message) to update/remove a location record for the wireless device 102.

Figure 8D:
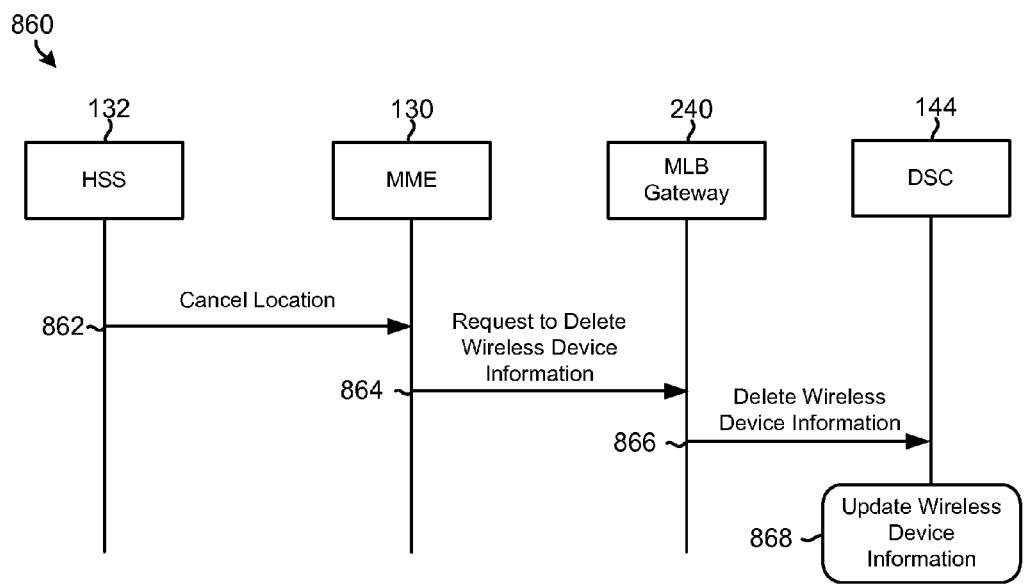

FIG. 8D illustrates a method of updating/deleting location information for a wireless device 102 in response to detecting a HSS-initiated detach procedure. In operation 862 of method 860, a HSS 132 may send a "cancel location" message to MME 130 to commence the HSS-initiated detach procedure. In operation 864, the MME 130 may send a request to delete wireless device information to the MLB gateway 240, which may update its records (e.g., update or remove a location record for the wireless device 102) and forward the message to a DSC 144 in operation 866. In operation block 868, the DSC 144 may receive the request message and use the information included in the received request message to update or remove a location record for the wireless device 102.

The methods 800, 820, 840, 860 discussed above may be used to keep the MLB gateway 240 and DSC 144 informed of the locations of the wireless device 102 so that it can make better and more informed decisions. These methods allow the DSA components to store up-to-date information (e.g., location or database records) for the wireless devices. The DSA components may also use this information to identify candidate devices for handin and backoff operations (e.g., due to mobility of the devices), as well as to determine whether to reassign a wireless device to another MME component.

The DSC 144 may designate a lessee wireless device 102 that is determined to be moving towards a lessor's grid boundary (where a bid is active for the lessee) as candidate for a handin procedure. Similarly, a DSC 144 may designate a lessee wireless device 102 that has moved out of the grid boundary as a candidate for backoff (from the view of lessor DSC). In addition, the DPC 146 and/or DSC 144 components may be configured to perform various special functions to further support the mobility of lessee wireless devices as they are moved between the lessee and lessor networks. These special functions may include identifying a resource grid, determining a buffer zone for the grid, finding geographical boundaries or boundaries during wireless device mobility, performing inter-network handovers for connected wireless devices, monitoring a wireless device's vicinity, determining whether a wireless device is an idle, determining congestion state changes, etc. These special functions may further include handling coverage gaps due to cell outages or blacklisting during a handin, a handoff, or backoff procedure. In addition, these special functions may include identifying operator policies, determining blacklists and dynamic changes via a grid map, and pre-planning a handin, a handoff, or a backoff procedure. The special function may further include performing mobility-based, congestion-based, bid-based, or expiry-based backoff operations.

In an embodiment, the DSA system may be configured to lease-out or allocate resources based on geographical areas, such as a license area, a regional area, a cell/sector region, and/or a subsector cell region. The DSA system may be further configured to divide the relevant geographical areas into subunits, generate a grid-map data structure that identifies these geographic subunits, and use the grid-map data structure to allocate, de-allocate, and reallocate resources based on the geographical locations of the wireless devices with respect to the available resources.

Figure 9:
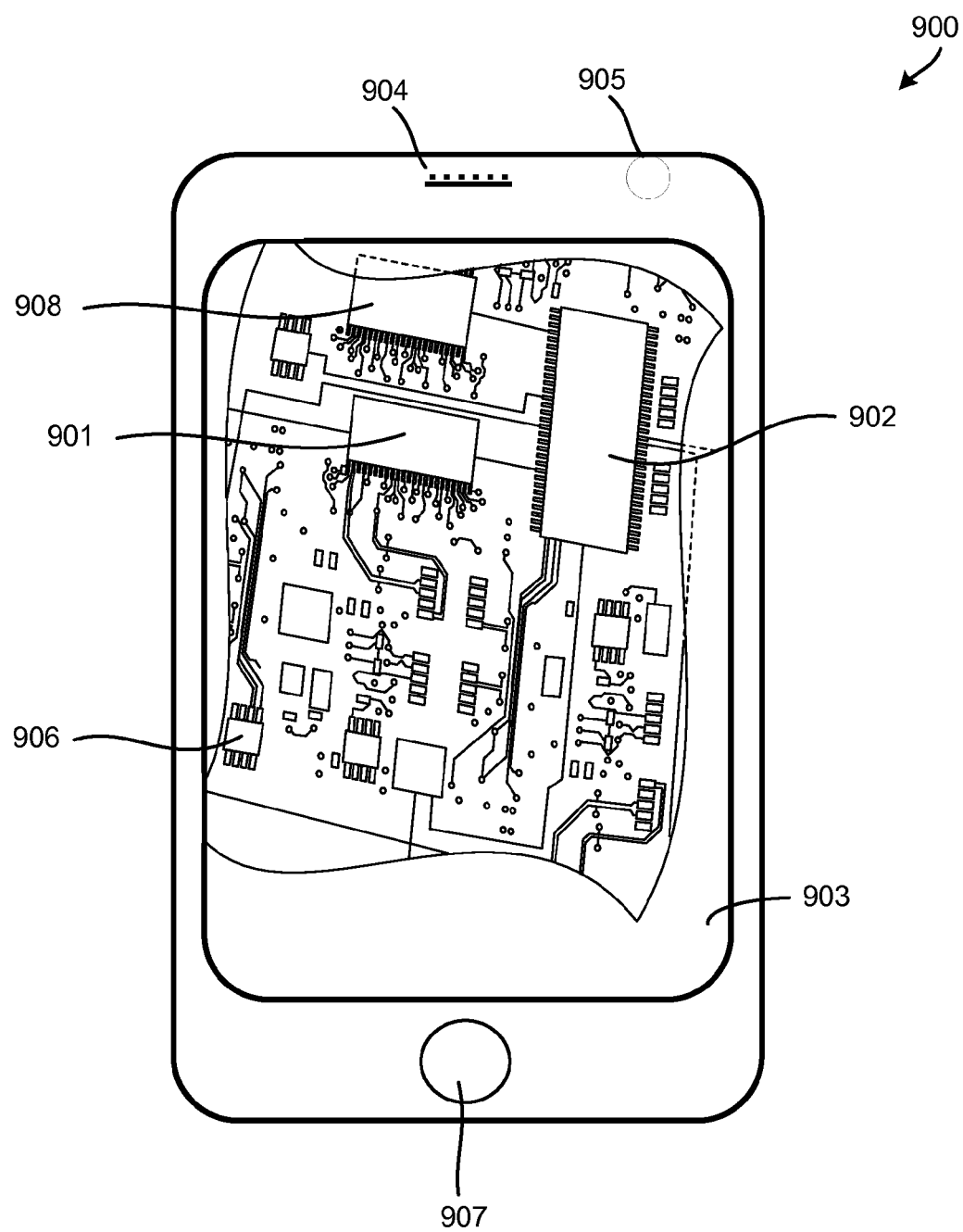
FIG. 9 is a component block diagram of an example wireless device suitable for use with the various embodiments.

The various embodiments may be implemented on a variety of wireless computing devices, an example of which is illustrated in FIG. 9. Specifically, FIG. 9 is a system block diagram of a wireless transceiver device in the form of a smartphone/cell phone 900 suitable for use with any of the embodiments. The cell phone 900 may include a processor 901 coupled to internal memory 902, a display 903, and to a speaker 904. Additionally, the cell phone 900 may include an antenna 905 for sending and receiving electromagnetic radiation that may be connected to a wireless data link and/or cellular telephone transceiver 906 coupled to the processor 901. Cell phones 900 typically also include menu selection buttons or rocker switches 907 for receiving user inputs.

A typical cell phone 900 also includes a sound encoding/decoding (CODEC) circuit 908 which digitizes sound received from a microphone into data packets suitable for wireless transmission and decodes received sound data packets to generate analog signals that are provided to the speaker 904 to generate sound. Also, one or more of the processor 901, wireless transceiver 906 and CODEC 908 may include a digital signal processor (DSP) circuit (not shown separately). The cell phone 900 may further include a ZigBee transceiver (i.e., an IEEE 802.15.4 transceiver) for low-power short-range communications between wireless devices, or other similar communication circuitry (e.g., circuitry implementing the Bluetooth® or WiFi protocols, etc.).

Figure 10:
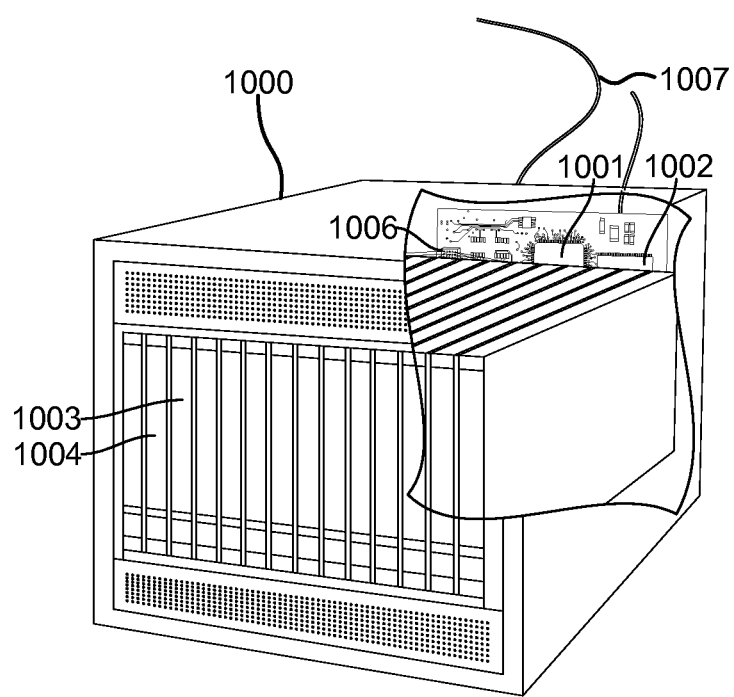
FIG. 10 is a component block diagram of a server suitable for use with an embodiment.

The embodiments described above, including the spectrum arbitrage functions, may be implemented within a broadcast system on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing data connections with a network 1007, such as a local area network coupled to other communication system computers and servers.

The processors 901, 1001, may be any programmable microprocessor, microcomputer or multiple processor chip or chips that can be configured by software instructions (applications) to perform a variety of functions, including the functions of the various embodiments described below. In some devices, multiple processors may be provided, such as one processor dedicated to wireless communication functions and one processor dedicated to running other applications. Typically, software applications may be stored in the internal memory 902, 1002, before they are accessed and loaded into the processor 901, 901. The processor 901, 1001 may include internal memory sufficient to store the application software instructions. In some servers, the processor 1001 may include internal memory sufficient to store the application software instructions. In some receiver devices, the secure memory may be in a separate memory chip coupled to the processor 901. The internal memory 902, 1002 may be a volatile or nonvolatile memory, such as flash memory, or a mixture of both. For the purposes of this description, a general reference to memory refers to all memory accessible by the processor 901, 1001, including internal memory 902, 1002, removable memory plugged into the device, and memory within the processor 901, 1001 itself.

As used in this application, the terms "component," "module," "balancer" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DPC), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DPC and a microprocessor, a plurality of microprocessors, one or more microprocessors in conjunction with a DPC core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A dynamic spectrum arbitrage (DSA) method, comprising:
receiving, in a processor of a mobility load balancer gateway (MLB) component in a second communication network, a communication message that includes information indicating that a wireless device in a first communication network will commence using a resource in the second communication network, the second communication network including a pool of mobility management entity (MME) components, the pool of MME components including a plurality of MME components, each MME component in the plurality of MME components being associated with at least one cell site, each cell site including at least one eNodeB;
determining, via the processor, a current capacity of each of the plurality of MME components in the pool of MMEs;
selecting, via the processor, one MME component from the pool of MMEs to manage mobility operations for the wireless device after the wireless device is handed over to the second communication network based on the determined current capacities; and
sending the received communication message to the selected MME component to cause the wireless device to be assigned to the selected MME component after it is handed over to the second communication network.

2. The method of claim 1, wherein determining the current capacity of each of the plurality of MME components in the pool of MMEs comprises determining a current workload and remaining processing capacity of an MME component.

3. The method of claim 1, wherein selecting one MME component from the pool of MMEs to manage mobility operations for the wireless device after the wireless device is handed over to the second communication network based on the determined current capacities comprises selecting an MME component from the pool of MMEs so as to load balance network traffic across all MMEs in the pool of MMEs.

4. The method of claim 1, wherein selecting one MME component from the pool of MMEs to manage mobility operations for the wireless device after the wireless device is handed over to the second communication network based on the determined current capacities comprises selecting an MME component from the pool of MMEs so as to steer network traffic to an MME component in the pool of MMEs that is determined to have the highest current capacity.

5. The method of claim 1, further comprising:
receiving updated capacity information for each of the plurality of MME components in the pool of MMEs;
determining that the wireless device moved from a first cell site in the second communication network to a second cell site in the second communication network;
selecting a new MME component from the pool of MMEs for the wireless device based on the updated capacity information in response to determining that the wireless device moved from the first cell site in the second communication network to the second cell site in the second communication network.

6. The method of claim 1, further comprising:
establishing a first communication link between a communications server and a first server in the first communication network;
establishing a second communication link between the communications server and a second server in the second communication network;
receiving in the communications server a request for resources from the first server;
determining in the communications server an amount of resources in the second communication network that available for allocation for use by wireless devices in the first communication network; and
allocating a portion of the available resources of the second communication network for access and use by wireless devices of the first communication network; and
generating the communication message that includes information indicating that the wireless device in the first communication network will commence using the resource of the second communication network.

7. A mobility load balancer gateway (MLB) server computing device deployed in a second communication network, comprising:
a processor configured with processor executable instructions to perform operations comprising:
receiving a communication message that includes information indicating that a wireless device in a first communication network will commence using a resource in the second communication network, the second communication network including a pool of mobility management entity (MME) components, the pool of MME components including a plurality of MME components, each MME component in the plurality of MME components being associated with at least one cell site, each cell site including at least one eNodeB;
determining a current capacity of each of the plurality of MME components in the pool of MMEs;
selecting one MME component from the pool of MMEs to manage mobility operations for the wireless device after the wireless device is handed over to the second communication network; and
sending the received communication message to the selected MME component to cause the wireless device to be assigned to the selected MME component after it is handed over to the second communication network.

8. The server computing device of claim 7, wherein the processor is configured with processor-executable instructions to perform operations such that determining the current capacity of each of the plurality of MME components in the pool of MMEs comprises determining a current workload and remaining processing capacity of an MME component.

9. The server computing device of claim 7, wherein the processor is configured with processor-executable instructions to perform operations such that selecting one MME component from the pool of MMEs to manage mobility operations for the wireless device after the wireless device is handed over to the second communication network based on the determined current capacities comprises selecting an MME component from the pool of MMEs so as to load balance network traffic across all MMEs in the pool of MMEs.

10. The server computing device of claim 7, wherein the processor is configured with processor-executable instructions to perform operations such that selecting one MME component from the pool of MMEs to manage mobility operations for the wireless device after the wireless device is handed over to the second communication network based on the determined current capacities comprises selecting an MME component from the pool of MMEs so as to steer network traffic to an MME component in the pool of MMEs that is determined to have the highest current capacity.

11. The server computing device of claim 7, wherein the processor is configured with processor-executable instructions to perform operations further comprising:
receiving updated capacity information for each of the plurality of MME components in the pool of MMEs;
determining that the wireless device moved from a first cell site in the second communication network to a second cell site in the second communication network;
selecting a new MME component from the pool of MMEs for the wireless device based on the updated capacity information in response to determining that the wireless device moved from the first cell site in the second communication network to the second cell site in the second communication network.

12. A non-transitory computer readable storage medium having stored thereon processor-executable software instructions configured to cause a processor of a mobility load balancer gateway (MLB) server computing device that is deployed in a second communication network to perform operations comprising:
receiving a communication message that includes information indicating that a wireless device in a first communication network will commence using a resource in the second communication network, the second communication network including a pool of mobility management entity (MME) components, the pool of MME components including a plurality of MME components, each MME component in the plurality of MME components being associated with at least one cell site, each cell site including at least one eNodeB;
determining a current capacity of each of the plurality of MME components in the pool of MMEs;
selecting one MME component from the pool of MMEs to manage mobility operations for the wireless device after the wireless device is handed over to the second communication network; and
sending the received communication message to the selected MME component to cause the wireless device to be assigned to the selected MME component after it is handed over to the second communication network.

13. The non-transitory computer readable storage medium of claim 12, wherein stored processor-executable software instructions are configured to cause a processor to perform operations such that determining the current capacity of each of the plurality of MME components in the pool of MMEs comprises determining a current workload and remaining processing capacity of an MME component.

14. The non-transitory computer readable storage medium of claim 12, wherein stored processor-executable software instructions are configured to cause a processor to perform operations such that selecting one MME component from the pool of MMEs to manage mobility operations for the wireless device after the wireless device is handed over to the second communication network based on the determined current capacities comprises selecting an MME component from the pool of MMEs so as to load balance network traffic across all MMEs in the pool of MMEs.

15. The non-transitory computer readable storage medium of claim 12, wherein stored processor-executable software instructions are configured to cause a processor to perform operations such that selecting one MME component from the pool of MMEs to manage mobility operations for the wireless device after the wireless device is handed over to the second communication network based on the determined current capacities comprises selecting an MME component from the pool of MMEs so as to steer network traffic to an MME component in the pool of MMEs that is determined to have the highest current capacity.

16. The non-transitory computer readable storage medium of claim 12, wherein stored processor-executable software instructions are configured to cause a processor to perform operations further comprising:
receiving updated capacity information for each of the plurality of MME components in the pool of MMEs;
determining that the wireless device moved from a first cell site in the second communication network to a second cell site in the second communication network;
selecting a new MME component from the pool of MMEs for the wireless device based on the updated capacity information in response to determining that the wireless device moved from the first cell site in the second communication network to the second cell site in the second communication network.

* * * * *